(12) United States Patent
Jung et al.

(10) Patent No.: US 11,218,901 B2
(45) Date of Patent: Jan. 4, 2022

(54) METHOD AND DEVICE FOR MAPPING BETWEEN TRAFFIC CLASS AND PROXIMITY-BASED SERVICE PER PACKET PRIORITY IN WIRELESS COMMUNICATION SYSTEM

(71) Applicant: LG Electronics Inc., Seoul (KR)

(72) Inventors: Sunghoon Jung, Seoul (KR);
Seungryul Yang, Seoul (KR);
Seoyoung Back, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/634,069

(22) PCT Filed: Aug. 13, 2019

(86) PCT No.: PCT/KR2019/010332
§ 371 (c)(1),
(2) Date: Jan. 24, 2020

(87) PCT Pub. No.: WO2020/036426
PCT Pub. Date: Feb. 20, 2020

(65) Prior Publication Data
US 2021/0160728 A1 May 27, 2021

Related U.S. Application Data

(60) Provisional application No. 62/718,375, filed on Aug. 13, 2018.

(30) Foreign Application Priority Data

Aug. 20, 2018 (KR) .................. 10-2018-0096777

(51) Int. Cl.
*H04W 4/00* (2018.01)
*H04W 28/02* (2009.01)
(Continued)

(52) U.S. Cl.
CPC ......... *H04W 28/0263* (2013.01); *H04W 4/40* (2018.02); *H04W 68/005* (2013.01); *H04W 76/27* (2018.02); *H04W 80/02* (2013.01)

(58) Field of Classification Search
None
See application file for complete search history.

(56) References Cited

U.S. PATENT DOCUMENTS

2012/0117140 A1 5/2012 Wang et al.
2012/0321052 A1* 12/2012 Morrill .................. H04L 67/18
379/32.01
(Continued)

FOREIGN PATENT DOCUMENTS

KR 20160045746 4/2016
KR 1020170112945 10/2017
(Continued)

OTHER PUBLICATIONS

Extended European Search Report in European Appln. No. 19832266.1, dated Jun. 10, 2020, 10 pages.
(Continued)

*Primary Examiner* — Elisabeth Benoit Magloire
(74) *Attorney, Agent, or Firm* — Fish & Richardson P.C.

(57) ABSTRACT

A method for operating a first apparatus in a wireless communication system is provided. The method may include receiving one or more traffic classes (TCs) related to one or more packets from a higher layer; mapping the one or more TCs and one or more proximity-based service per-packet priorities (PPPPs); and transmitting the one or more packets related to the one or more PPPPs to a second apparatus based on the mapping.

9 Claims, 29 Drawing Sheets

(51) Int. Cl.
    *H04W 4/40*     (2018.01)
    *H04W 76/27*     (2018.01)
    *H04W 68/00*     (2009.01)
    *H04W 80/02*     (2009.01)

(56) References Cited

U.S. PATENT DOCUMENTS

| | | |
|---|---|---|
| 2015/0016266 A1 | 1/2015 | Dumitrescu et al. |
| 2015/0100991 A1* | 4/2015 | Risberg .............. H04L 67/104 725/80 |
| 2015/0237141 A1 | 8/2015 | Staehlin |
| 2016/0219088 A1* | 7/2016 | Ma .................... H04L 47/32 |
| 2018/0192433 A1 | 7/2018 | Ouyang et al. |
| 2020/0367096 A1* | 11/2020 | Hwang ............... H04W 28/02 |
| 2021/0012661 A1* | 1/2021 | Yang .................. G08G 1/166 |

FOREIGN PATENT DOCUMENTS

| | | |
|---|---|---|
| WO | WO2017171250 | 10/2017 |
| WO | WO2018128205 | 7/2018 |

OTHER PUBLICATIONS

Huawei, HiSilicon, "Priority handling based on ProSe Per Packet Priority," R2-15448, 3GPP TSG-RAN WG2 Meeting #91bis, Malmo, Sweden, Oct. 5-9, 2015, 7 pages.

LG Electronics Inc., "UE autonomous resource selection mode in MAC CR," R2-165690, 3GPP TSG-RAN WG2 #95, Gothenburg, Sweden, Aug. 22-26, 2016, 6 pages.

European Office Action in European Appln. No. 19832266.1, dated Oct. 16, 2020, 8 pages.

Kuhlmorgen et al., "Evaluation of multi-hop packet prioritization for decentralized congestion control in VANETs," IEEE Wireless Communications and Networking Conference (WCNC), XP033095940, Mar. 19, 2017, 6 pages.

Huawei, HiSilicon, "Update and conclusion of Solution 6," S2-16 2540, SA WG2 Meeting #115, Nanjing, China, dated May 23-27, 2016, 7 pages.

JP Office Action in Japanese Appln. No. 2020-503874, dated Mar. 30, 2020, 4 pages (with English translation).

* cited by examiner (a)

(b)

(a)

(b)

METHOD AND DEVICE FOR MAPPING BETWEEN TRAFFIC CLASS AND PROXIMITY-BASED SERVICE PER PACKET PRIORITY IN WIRELESS COMMUNICATION SYSTEM

CROSS-REFERENCE TO RELATED APPLICATIONS

This application is a National Stage application under 35 U.S.C. § 371 of International Application No. PCT/KR2019/010332, filed on Aug. 13, 2019, which claims the benefit of U.S. Provisional Application No. 62/718,375, filed on Aug. 13, 2018, and Korean Patent Application No. 10-2018-0096777, filed on Aug. 20, 2018. The disclosures of the prior applications are incorporated by reference in their entirety.

BACKGROUND

Field

The present disclosure relates to a wireless communication system.

Related Art

A wireless communication system is a multiple access system that supports a communication with multiple users by sharing available system resources (e.g., bandwidth, transmission power, etc.). Examples of the multiple access system includes code division multiple access (CDMA) system, frequency division multiple access (FDMA) system, time division multiple access (TDMA) system, orthogonal frequency division multiple access (OFDMA) system, single carrier frequency division multiple access (SC-FDMA) system, multi carrier frequency division multiple access (MC-FDMA), and the like.

FIG. 1 shows examples of 5G usage scenarios to which the technical features of the present disclosure can be applied. The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Sidelink is a communication scheme that configures a direct link between User Equipments (UEs) and receives and transmits voice or data directly between UEs without passing through a Base Station (BS). Sidelink has been considered as a way that may solve burden of BS according to data traffic which is rapidly increasing.

V2X (vehicle-to-everything) means a communication technique for exchanging information among another vehicle, a pedestrian, an object equipped with an infra, and the like. V2X may be classified into four types such as V2V (vehicle-to-vehicle), V2I (vehicle-to-infrastructure), V2N (vehicle-to-network) and V2P (vehicle-to-pedestrian). The V2X communication may be provided through PC5 interface and/or Uu interface.

Meanwhile, as more and more communication devices require a larger communication capacity, there is a need for mobile broadband communication enhanced over the conventional radio access technology (RAT). Accordingly, a communication system design considering services or UEs sensitive to reliability and latency has been also under discussion, and the next generation radio access technology considering enhanced mobile broadband communication, massive MTC, and Ultra-Reliable and Low Latency Communication (URLLC) may be referred to as new RAT (radio access technology) or NR (new radio).

SUMMARY

Meanwhile, in a wireless communication system, different types of packet priority identifiers may be used between protocol layers. In the case that packets pass through a boundary of protocol layers having different types of packet priority identifiers from a specific protocol layer, a packet prioritization mechanism may be stopped immediately. For example, a case may occur that higher layer functions of ITS (intelligent transport system) station may be implemented by a specific radio access such as 802.11p, and different access layer of different type may be implemented based on 3GPP Sidelink (PC5 reference point). Therefore, it is required to propose a method for mapping between different types of packet priority identifiers to operate the packet priority mechanism between protocol layers.

According to an embodiment, a method for operating a first apparatus in a wireless communication system is proposed. The method may include receiving one or more traffic classes (TCs) related to one or more packets from a higher layer; mapping the one or more TCs and one or more proximity-based service per-packet priorities (PPPPs); and transmitting the one or more packets related to the one or more PPPPs to a second apparatus based on the mapping.

According to another embodiment, a method for operating a first apparatus in a wireless communication system is proposed. The method may include receiving one or more packets from a second apparatus; mapping one or more traffic classes (TCs) and one or more proximity-based service per-packet priorities (PPPPs) related to the received one or more packets; and transmitting the one or more packets related to the one or more TCs to a higher layer based on the mapping.

A network node may determine a packet priority between protocol layers having different types of packet priority identifiers by mapping different types of packet priority identifiers.

DESCRIPTION OF EXEMPLARY EMBODIMENTS

In the present disclosure, the term "I" and "," should be interpreted to indicate "and/or." For instance, the expression "A/B" may mean "A and/or B." Further, "A, B" may mean "A and/or B." Further, "AB/C" may mean "at least one of A, B, and/or C." Also, "A, B, C" may mean "at least one of A, B, and/or C."

Further, in the present disclosure, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
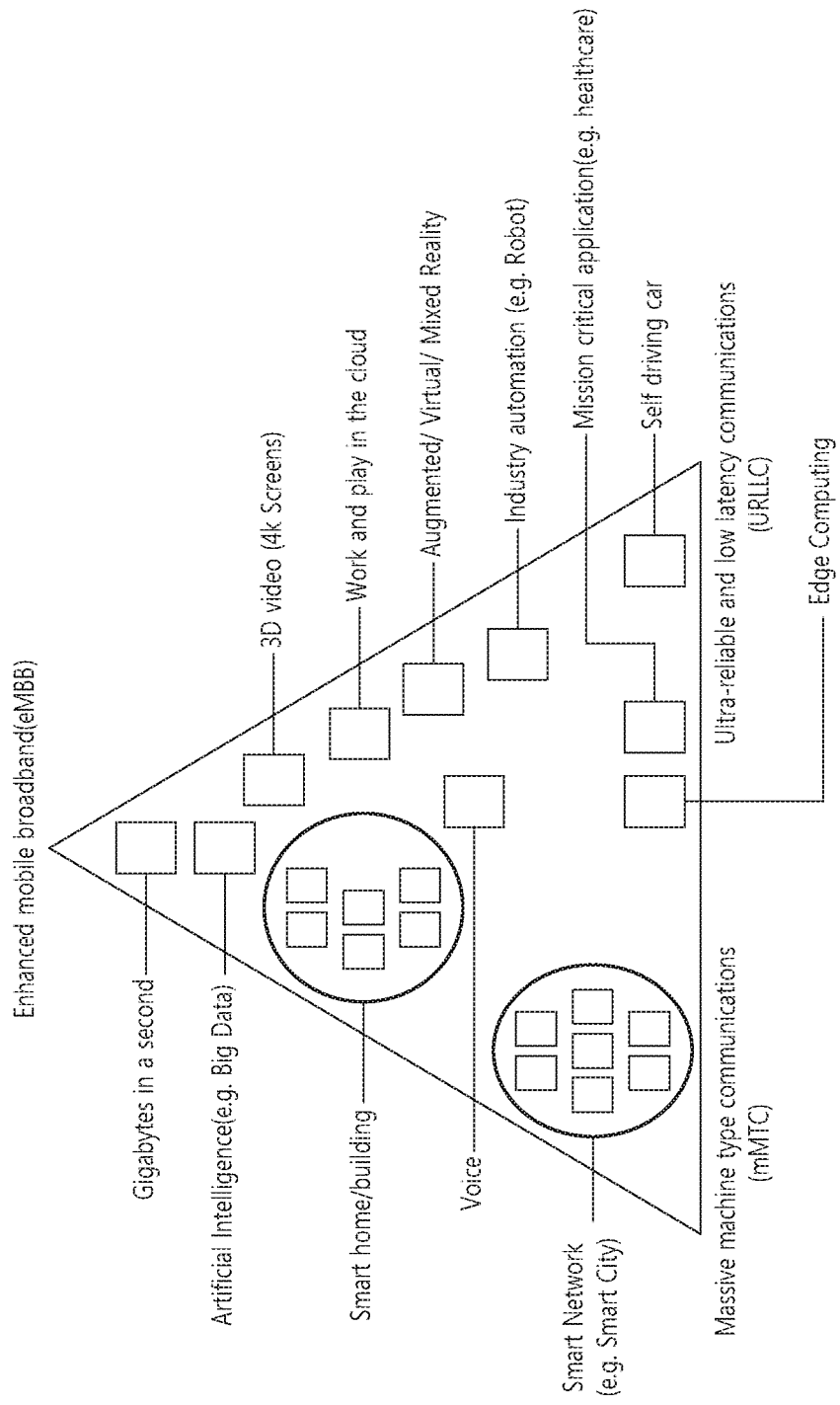
FIG. 1 shows examples of 5G usage scenarios to which the technical features of the present disclosure can be applied.
Figure 2:
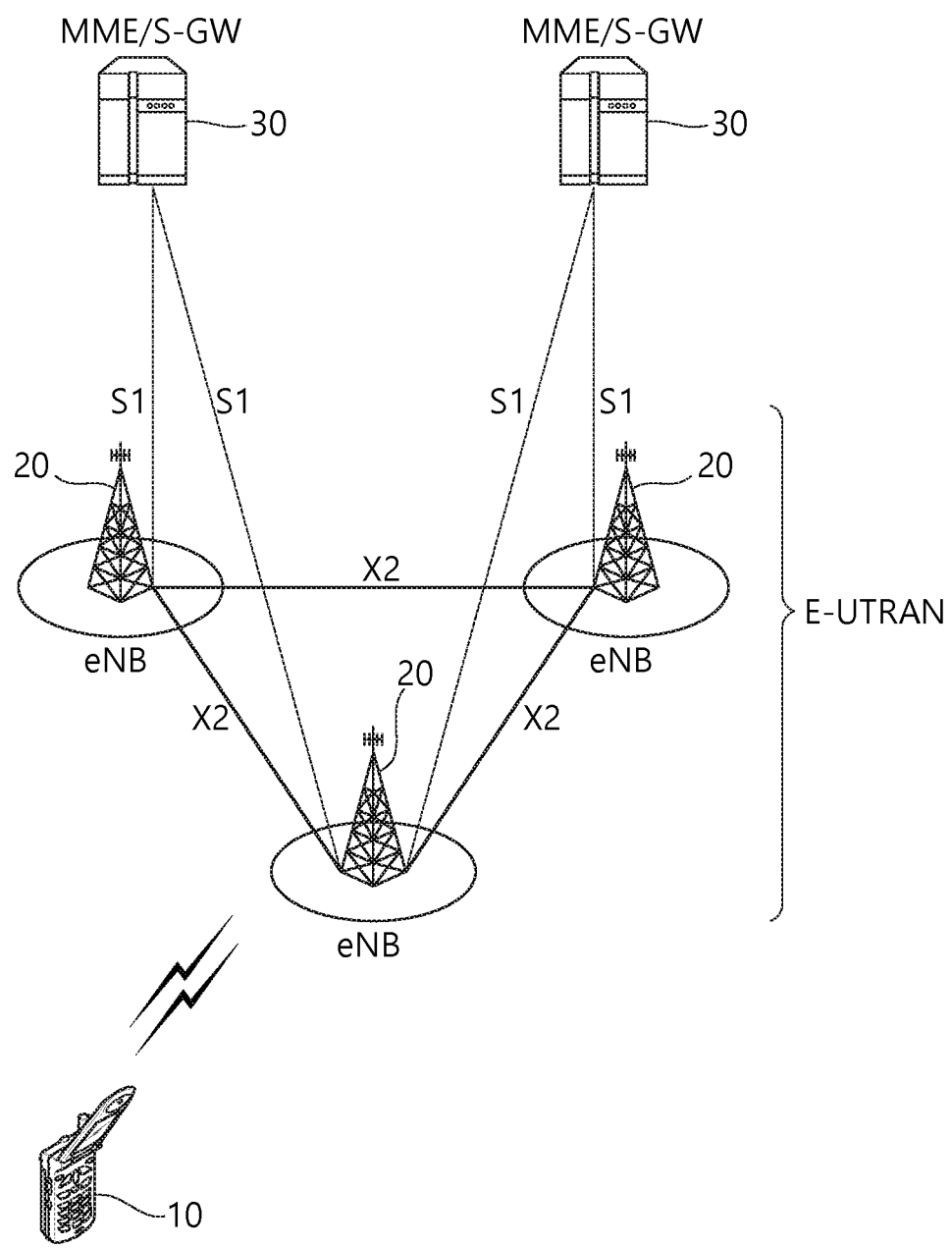
FIG. 2 shows a structure of an LTE system, in accordance with an embodiment of the present disclosure.

FIG. 2 shows a structure of an LTE system, in accordance with an embodiment of the present disclosure. This may also be referred to as an Evolved-UMTS Terrestrial Radio Access Network (E-UTRAN), or a Long Term Evolution (LTE)/LTE-A system.

Referring to FIG. 2, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The BS (20) refers to a fixed station that communicated with the UE (10) and may also be referred to by using different terms, such as evolved-NodeB (eNB), Base Transceiver System (BTS), Access Point (AP), and so on.

The BSs (20) are interconnected to one another through an X2 interface. The BSs (20) are connected to an Evolved Packet Core (EPC) (30) through an S1 interface. More specifically, the BS (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW corresponds to a gateway having an E-UTRAN as its endpoint. And, the P-GW corresponds to a gateway having a PDN as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the BS.

Figure 3:
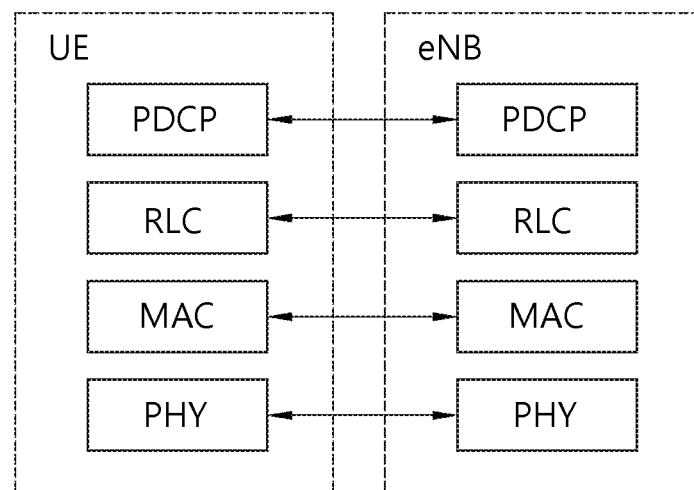
FIG. 3 shows a radio protocol architecture of a user plane of an LTE system, in accordance with an embodiment of the present disclosure.
Figure 4:
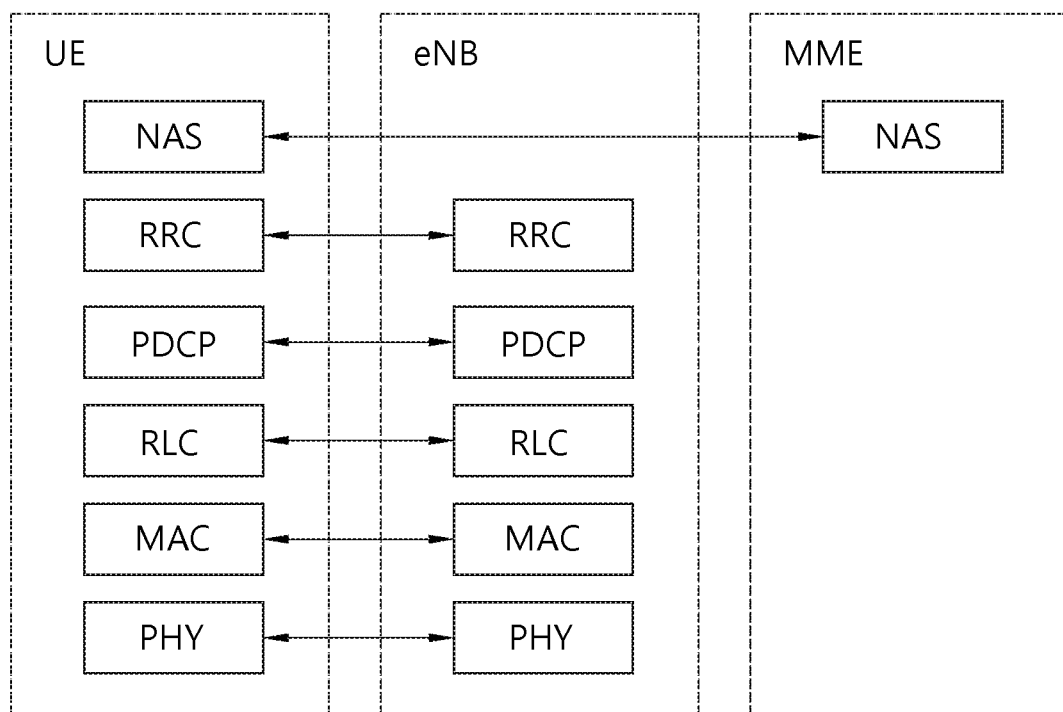
FIG. 4 shows a radio protocol architecture of a control plane of an LTE system, in accordance with an embodiment of the present disclosure.

FIG. 3 shows a radio protocol architecture of a user plane of an LTE system, in accordance with an embodiment of the present disclosure. FIG. 4 shows a radio protocol architecture of a control plane of an LTE system, in accordance with an embodiment of the present disclosure. The user plane corresponds to a protocol stack for user data transmission, and the control plane corresponds to a protocol stack for control signal transmission.

Referring to FIG. 3 and FIG. 4, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of RLC SDU. In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, and PDCP layer) in order to transport data between the UE and the network.

Functions of a Packet Data Convergence Protocol (PDCP) in the user plane include transfer, header compression, and ciphering of user data. Functions of a Packet Data Convergence Protocol (PDCP) in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signalling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in a RRC_IDLE state. In case of the NR, an RRC_INACTIVE state is additionally defined, and a UE being in the RRC_INACTIVE state may maintain its connection with a core network whereas its connection with the BS is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 5:
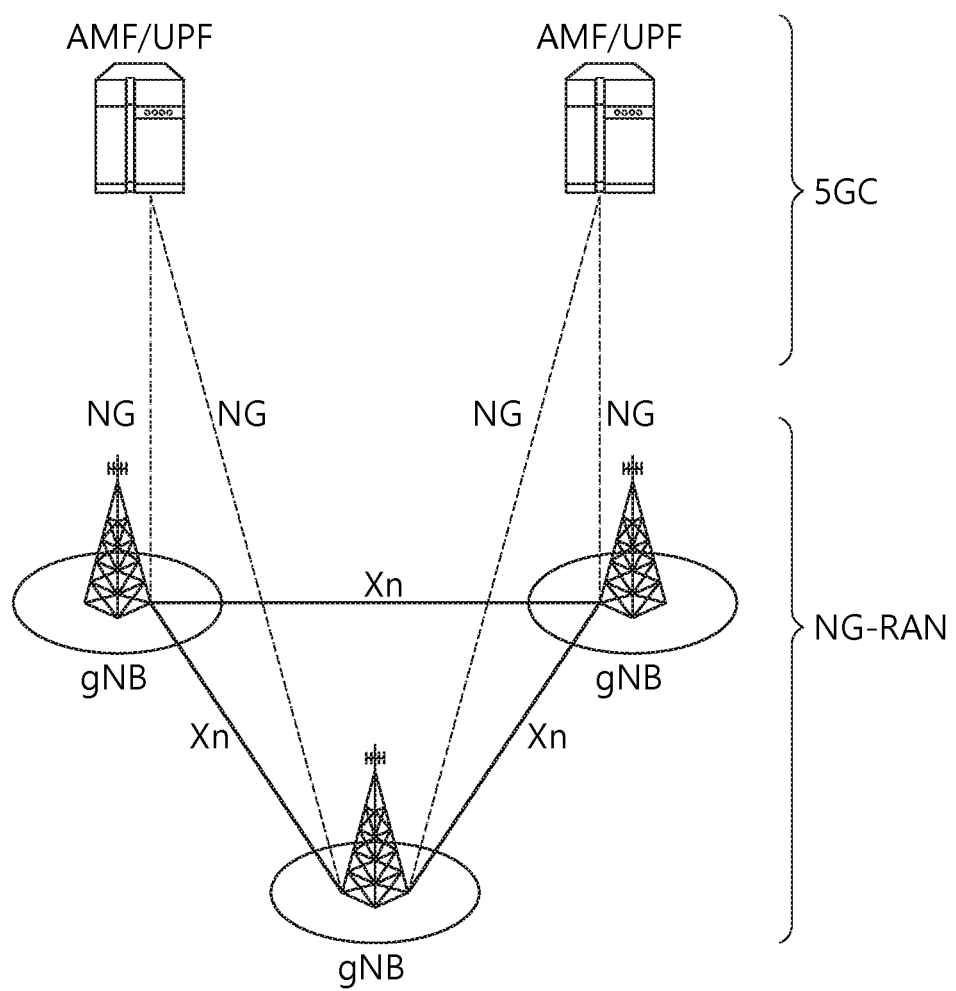
FIG. 5 shows a structure of an NR system, in accordance with an embodiment of the present disclosure.

FIG. 5 shows a structure of an NR system, in accordance with an embodiment of the present disclosure.

Referring to FIG. 5, an NG-RAN may include a gNB and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 6:
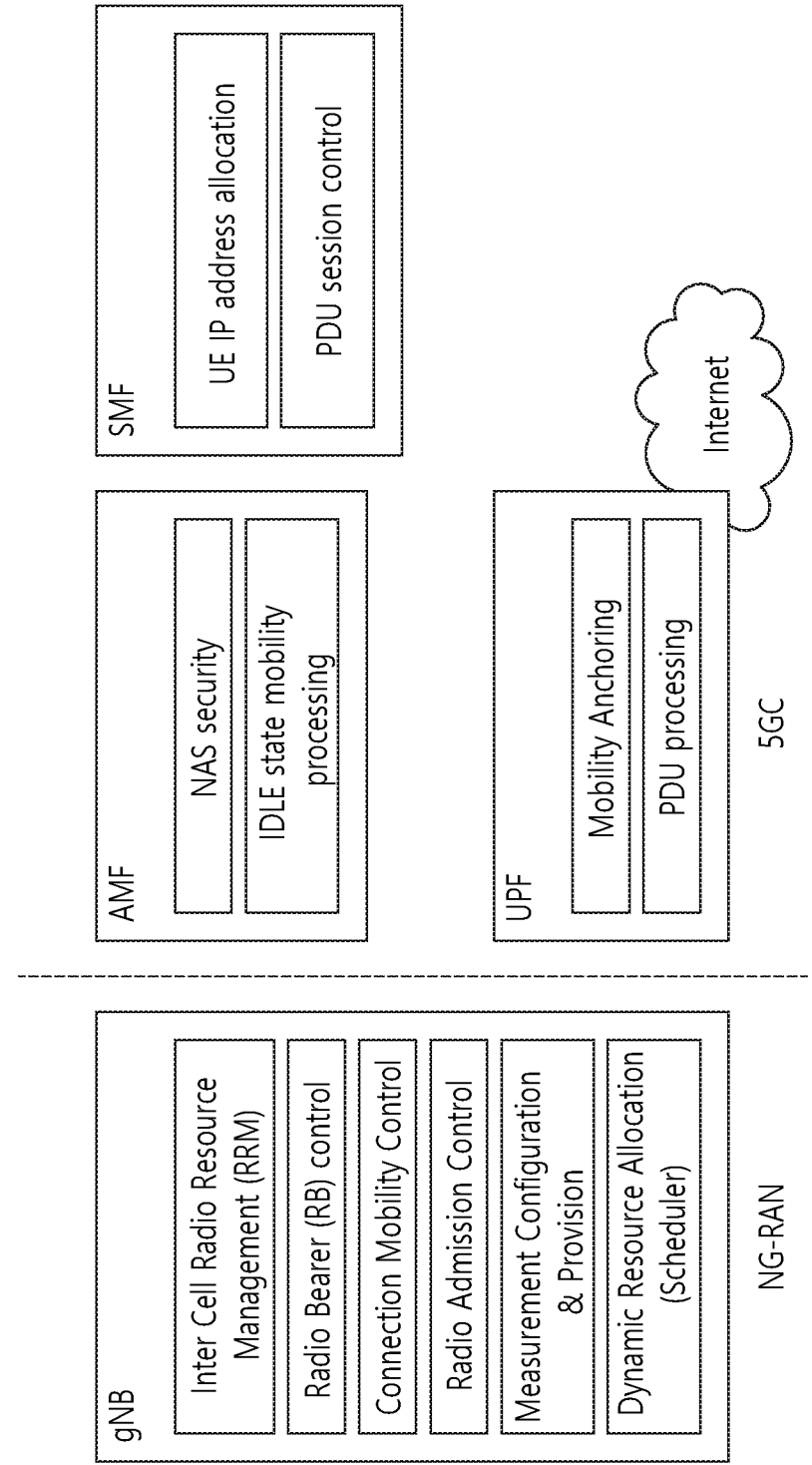
FIG. 6 shows a functional division between an NG-RAN and a 5GC, in accordance with an embodiment of the present disclosure.

FIG. 6 shows a functional division between an NG-RAN and a 5GC, in accordance with an embodiment of the present disclosure.

Referring to FIG. 6, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as NAS security, idle state mobility processing, and so on. A UPF may provide functions, such as Mobility Anchoring, PDU processing, and so on. A Session Management Function (SMF) may provide functions, such as UE IP address allocation, PDU session control, and so on.

Figure 7:
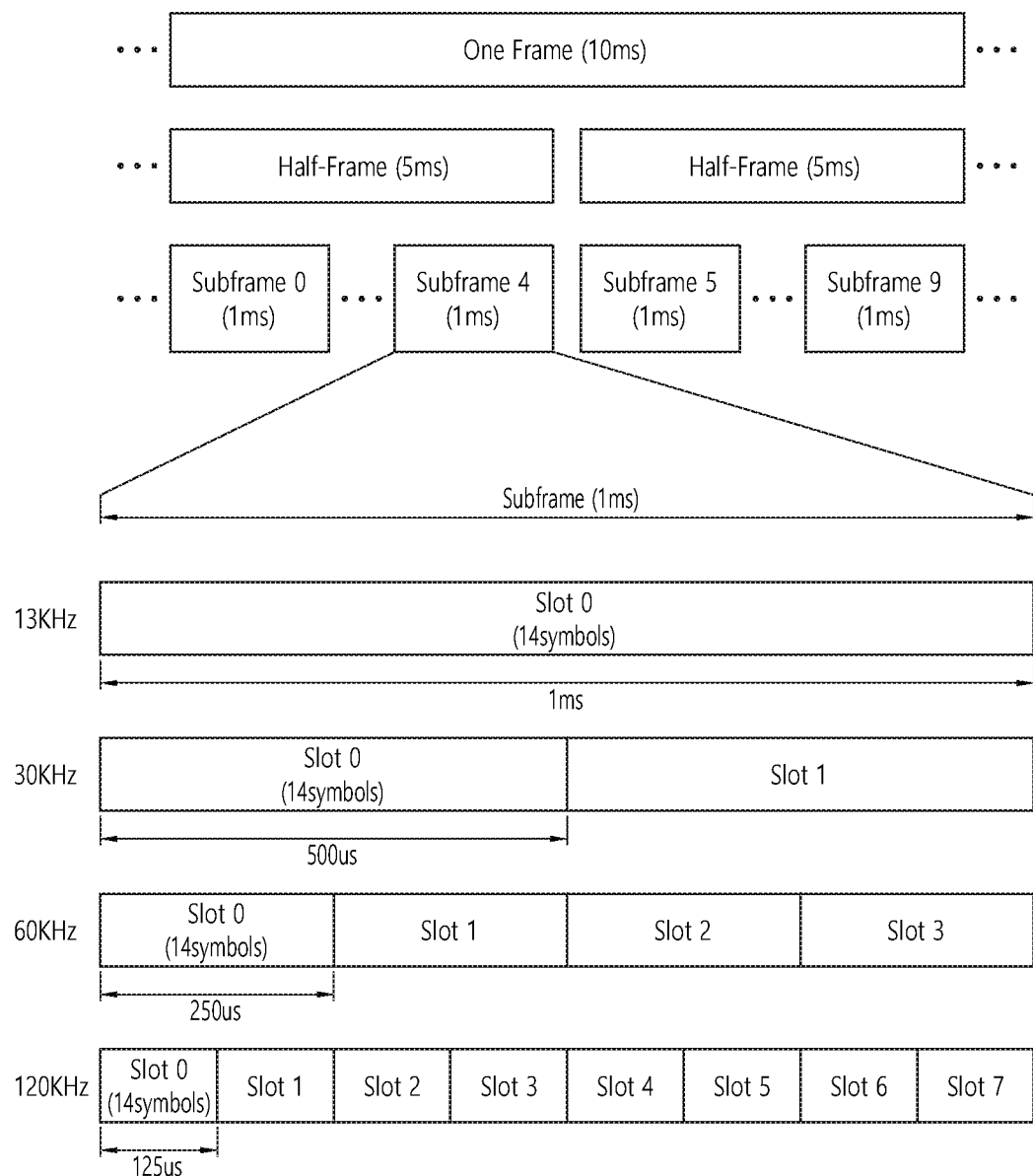
FIG. 7 shows a structure of a radio frame of an NR, in accordance with an embodiment of the present disclosure.

FIG. 7 shows a structure of a radio frame of an NR, in accordance with an embodiment of the present disclosure.

Referring to FIG. 7, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and an SC-FDMA symbol (or DFT-s-OFDM symbol).

Table 1 shown below represents an example of a number of symbols per slot (Nslotsymb), a number slots per frame (Nframe,uslot), and a number of slots per subframe (Nsubframe,uslot) in accordance with an SCS configuration (u), in a case where a normal CP is used.

TABLE 1

| SCS ($15 * 2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15 * 2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

Figure 8:
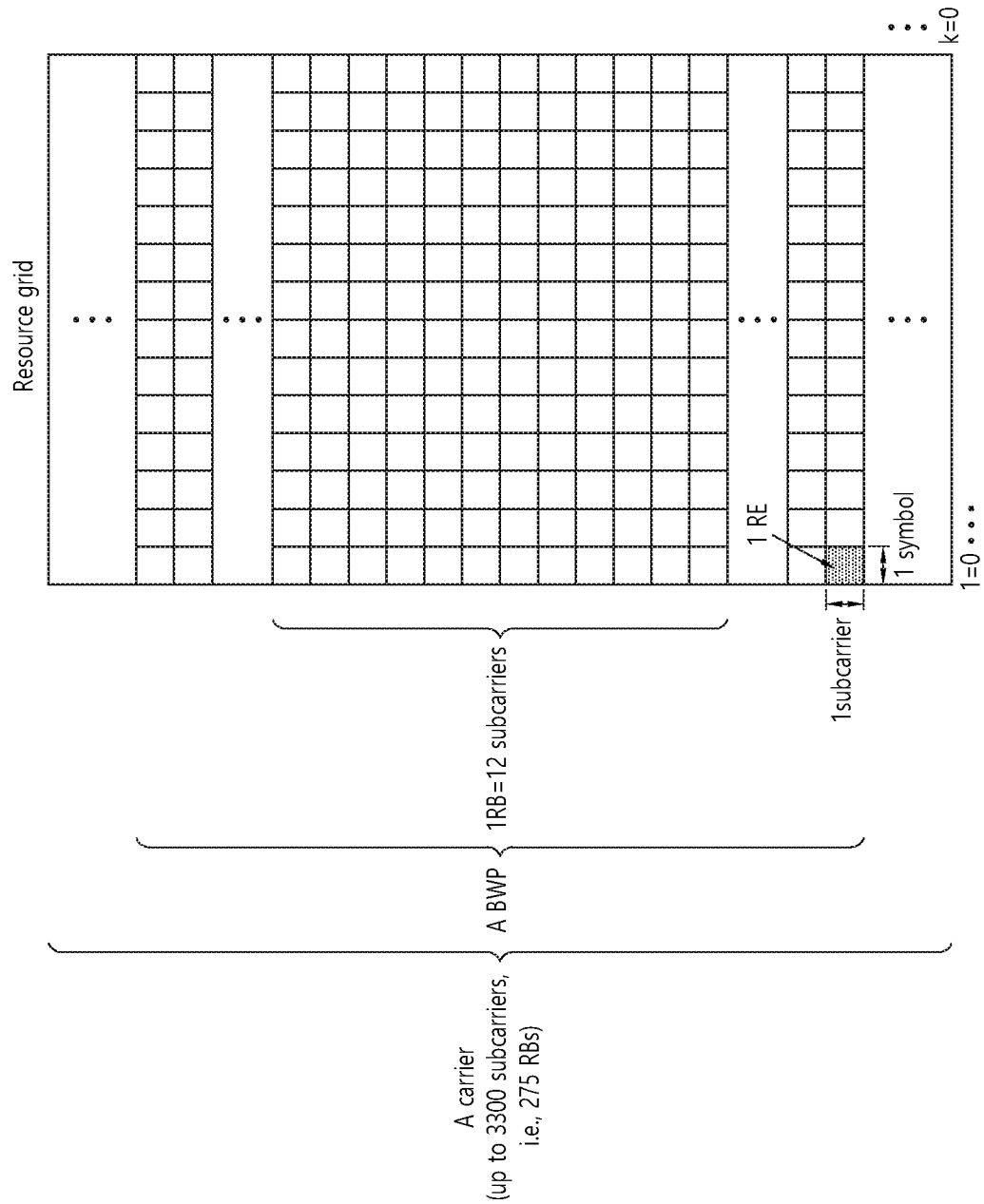
FIG. 8 shows a structure of a slot of an NR frame, in accordance with an embodiment of the present disclosure.

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. FIG. 8 shows a structure of a slot of an NR frame, in accordance with an embodiment of the present disclosure.

Referring to FIG. 8, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (P)RBs in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, V2X or sidelink communication will be described in detail.

Figure 9:
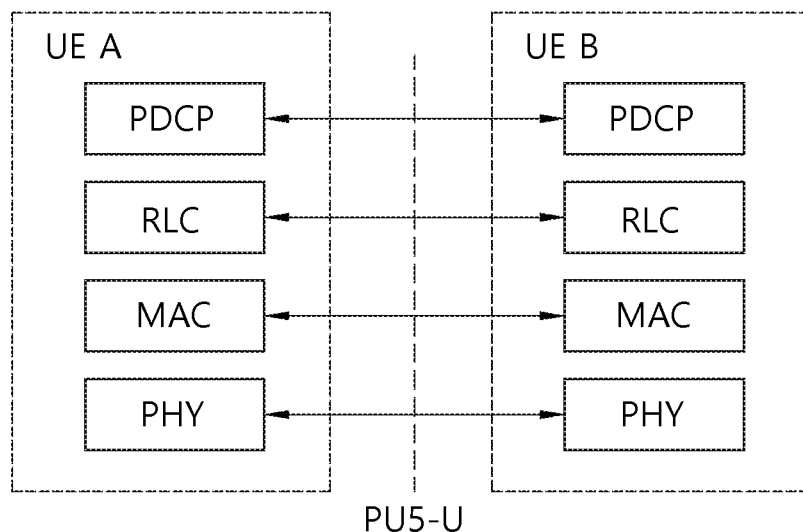
FIG. 9 shows a protocol stack for a sidelink communication, in accordance with an embodiment of the present disclosure.
Figure 9:
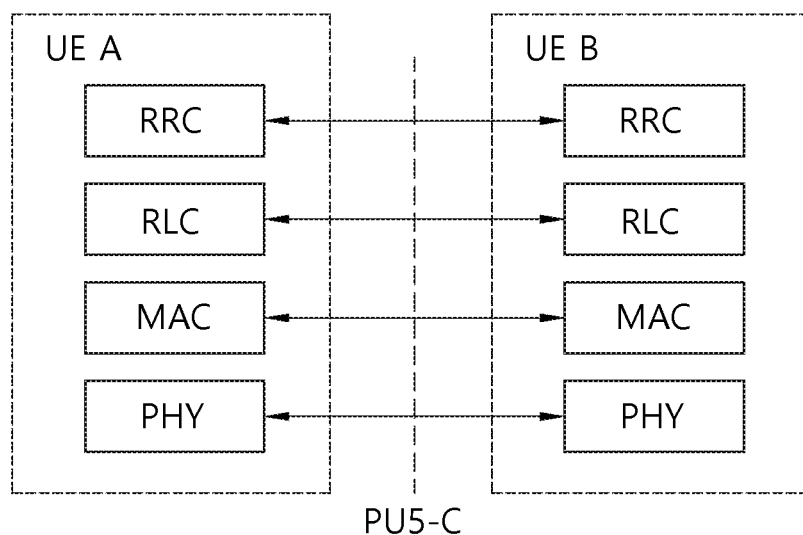

FIG. 9 shows a protocol stack for a sidelink communication, in accordance with an embodiment of the present disclosure. More specifically, (a) of FIG. 9 shows a user plane protocol stack of LTE, and (b) of FIG. 8 shows a control plane protocol stack of LTE.

Figure 10:
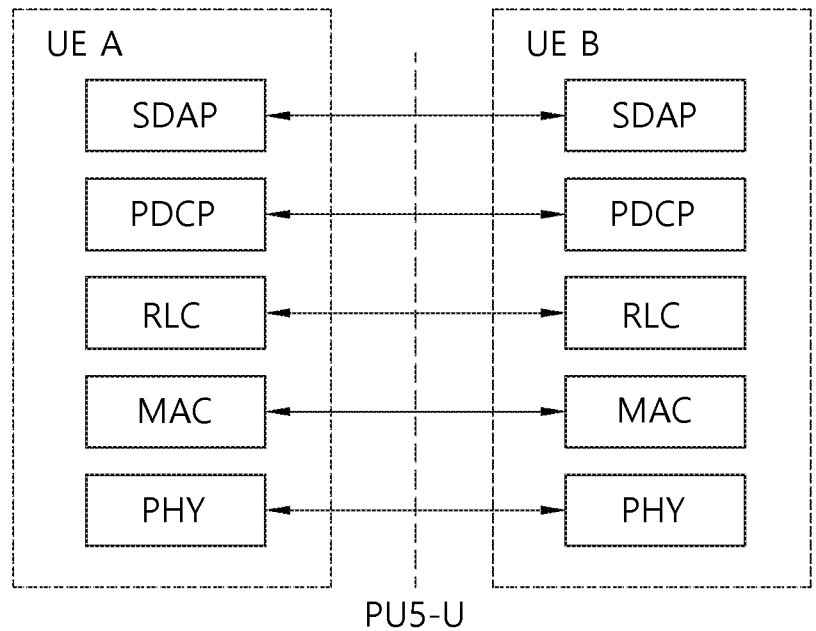
FIG. 10 shows a protocol stack for a sidelink communication, in accordance with an embodiment of the present disclosure.
Figure 10:
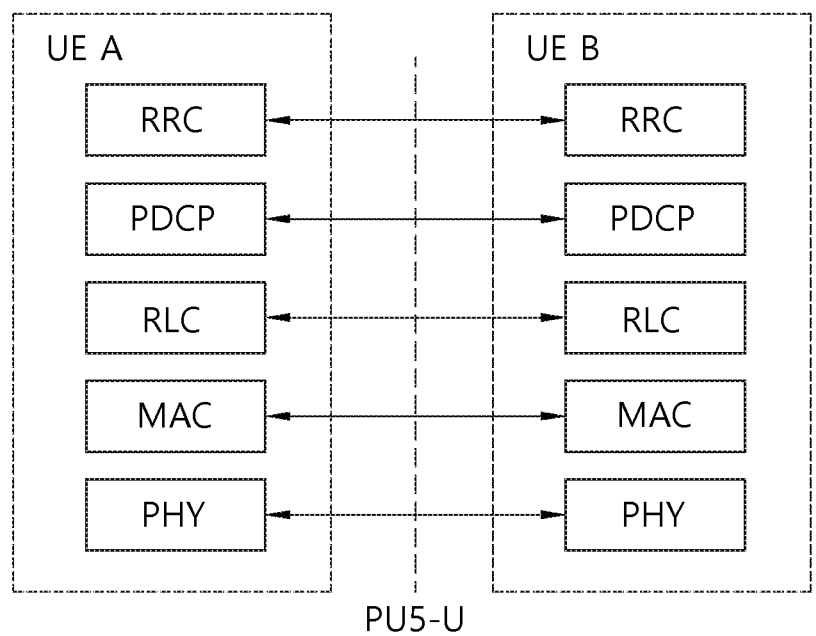

FIG. 10 shows a protocol stack for a sidelink communication, in accordance with an embodiment of the present disclosure. More specifically, (a) of FIG. 10 shows a user plane protocol stack of NR, and (b) of FIG. 10 shows a control plane protocol stack of NR.

Hereinafter, Sidelink Synchronization Signal (SLSS) and synchronization information will be described in detail.

SLSS corresponds to a sidelink specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS).

A Physical Sidelink Broadcast Channel (PSBCH) may correspond to a (broadcast) channel through which basic (system) information that should first be known by the UE before transmitting and receiving sidelink signals. For example, the basic information may correspond to information related to SLSS, a Duplex mode (DM), TDD UL/DL configuration, information related to a resource pool, application types related to SLSS, a subframe offset, broadcast information, and so on.

The S-PSS, the S-SSS, and the PSBCH may be included in a block format (e.g., a sidelink SS/PSBCH block, hereinafter referred to as S-SSB). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre-)configured SL BWP. And, a frequency position of the S-SSB may be (pre-)configured. Therefore, the UE is not required to perform a hypothesis detection in order to discover the S-SSB in the carrier.

Each SLSS may have a physical layer sidelink synchronization identity (ID), and the respective value may be equal to any one value ranging from 0 to 335. Depending upon any one of the above-described values that is used, a synchronization source may also be identified. For example, values of 0, 168, 169 may indicate global navigation satellite systems (GNSS), values from 1 to 167 may indicate BSs, and values from 170 to 335 may indicate that the source is outside of the coverage. Alternatively, among the physical layer sidelink synchronization ID values, values 0 to 167 may correspond to value being used by a network, and values from 168 to 335 may correspond to value being used outside of the network coverage.

Figure 11:
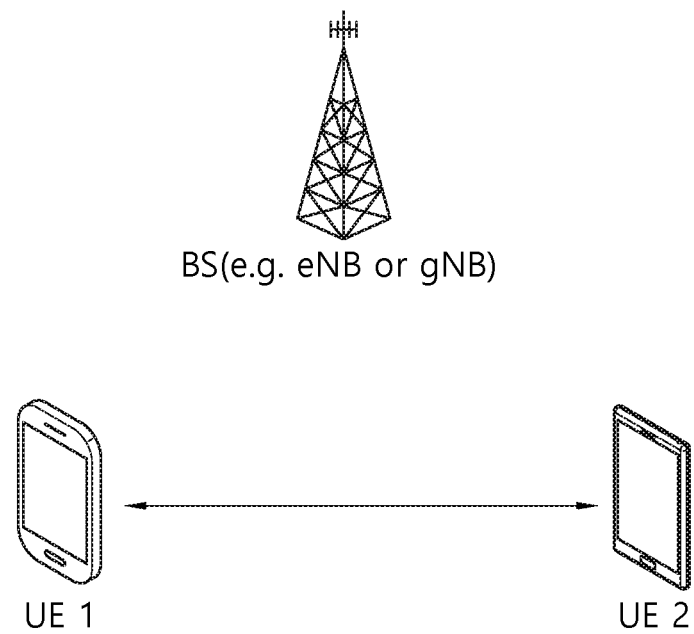
FIG. 11 shows an apparatus performing V2X or sidelink communication, in accordance with an embodiment of the present disclosure.

FIG. 11 shows an apparatus performing V2X or sidelink communication, in accordance with an embodiment of the present disclosure.

Referring to FIG. 11, in V2X/sidelink communication, the apparatus may refer to a UE. However, in case a network equipment, such as a BS, transmits and receives signals in accordance with a communication scheme between the network equipment and the UE, the BS may also be viewed as a type of the UE.

UE1 may select a resource unit corresponding to a specific resource within a resource pool, which refers to a set of resources, and UE1 may then be operated so as to transmit a sidelink signal by using the corresponding resource unit. UE2, which corresponds to a receiving UE, may be configured with a resource pool to which UE1 can transmit signals, and may then detect signals of UE1 from the corresponding resource pool.

Herein, in case UE1 is within a connection range of the BS, the BS may notify the resource pool. Conversely, in case UE1 is outside connection range of the BS, another UE may notify the resource pool or a pre-determined resource may be used.

Generally, a resource pool may be configured in a plurality of resource units, and each UE may select one resource unit or a plurality of resource units and may use the selected resource unit(s) for its sidelink signal transmission.

Figure 12:
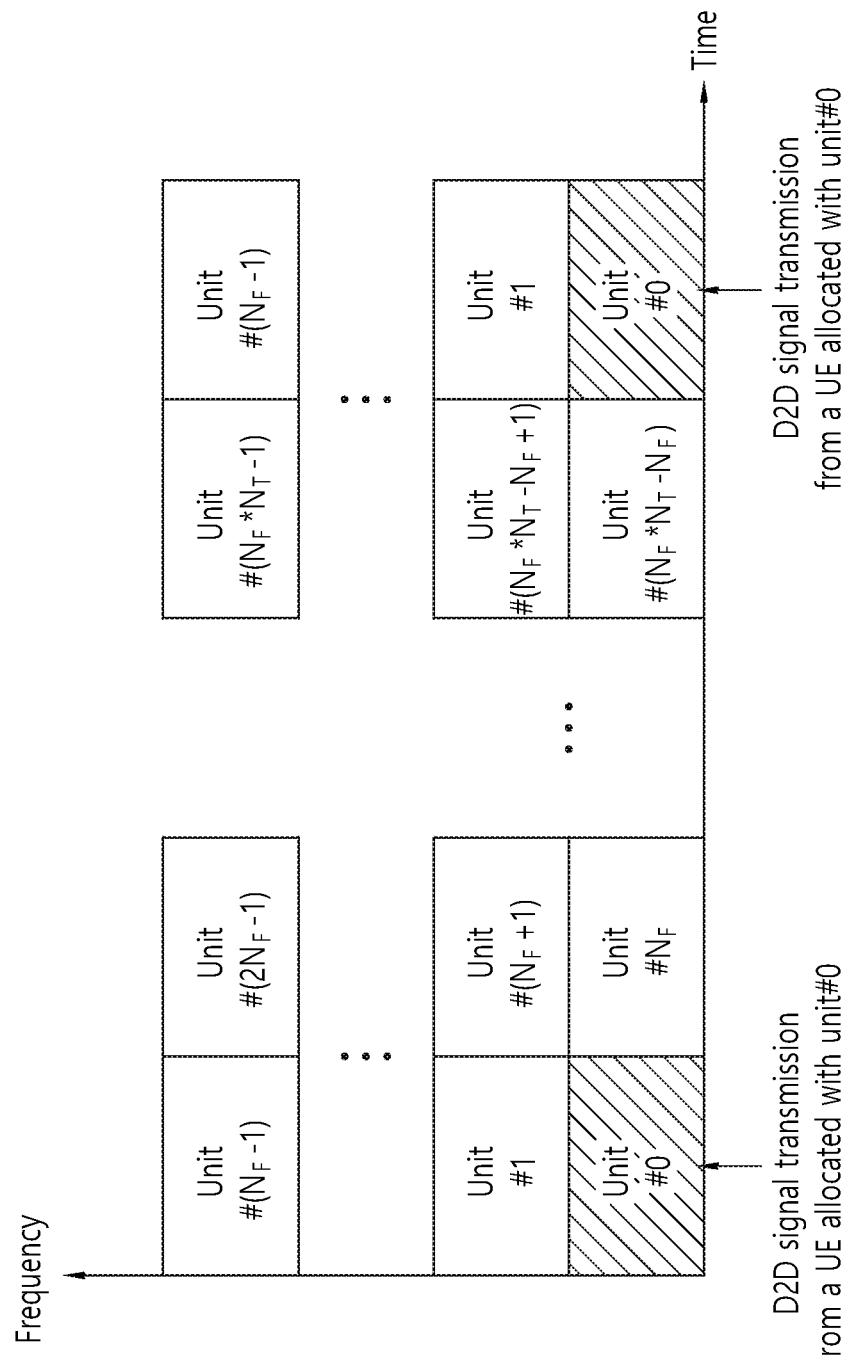
FIG. 12 shows an example of configuration of a resource unit, in accordance with an embodiment of the present disclosure.

FIG. 12 shows an example of configuration of a resource unit, in accordance with an embodiment of the present disclosure.

Referring to FIG. 12, the total frequency resources of the resource pool may be divided into NF number of resource units, the total time resources of the resource pool may be divided into NT number of resource units. Therefore, a total of NF*NT number of resource units may be defined in the resource pool. FIG. 11 shows an example of a case where the corresponding resource pool is repeated at a cycle of NT number of subframes.

As shown in FIG. 12, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a UE, which intends to transmit sidelink signals.

The resource pool may be segmented to multiple types. For example, depending upon the content of a sidelink signal being transmitted from each resource pool, the resource pool may be divided as described below.

(1) Scheduling Assignment (SA) may correspond to a signal including information, such as a position of a resource that is used for the transmission of a sidelink data channel, a Modulation and Coding Scheme (MC S) or MIMO transmission scheme needed for the modulation of other data channels, a Timing Advance (TA), and so on. The SA may also be multiplexed with sidelink data within the same resource unit and may then be transmitted, and, in this case, an SA resource pool may refer to a resource pool in which the SA is multiplexed with the sidelink data and then transmitted. The SA may also be referred to as a sidelink control channel.

(2) A Physical Sidelink Shared Channel (PSSCH) may correspond to a resource pool that is used by a transmitting UE for transmitting user data. If the SA is multiplexed with sidelink data within the same resource unit and then transmitted, only a sidelink data channel excluding the SA information may be transmitted from the resource pool that is configured for the sidelink data channel. In other words, REs that were used for transmitting SA information within a separate resource unit of the SA resource pool may still be used for transmitting sidelink data from the resource pool of a sidelink data channel.

(3) A discovery channel may correspond to a resource pool that is used by the transmitting UE for transmitting information, such as its own ID. By doing so, the transmitting UE may allow a neighbouring UE to discover the transmitting UE.

Even if the content of the above-described sidelink signal is the same, different resource pools may be used depending upon the transmission/reception attribute of the sidelink signal. For example, even if the same sidelink data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the BS designates a transmission resource of a separate signal to a separate transmitting UE or whether a separate transmitting UE selects a separate signal transmission resource on its own from the resource pool), and a signal format (e.g., a number of symbols occupied by each sidelink signal within a subframe or a number of subframes being used for the transmission of one sidelink signal) of the sidelink signal, signal intensity from the BS, a transmitting power intensity (or level) of a sidelink UE, and so on.

Hereinafter, resource allocation in a sidelink will be described in detail.

Figure 13:
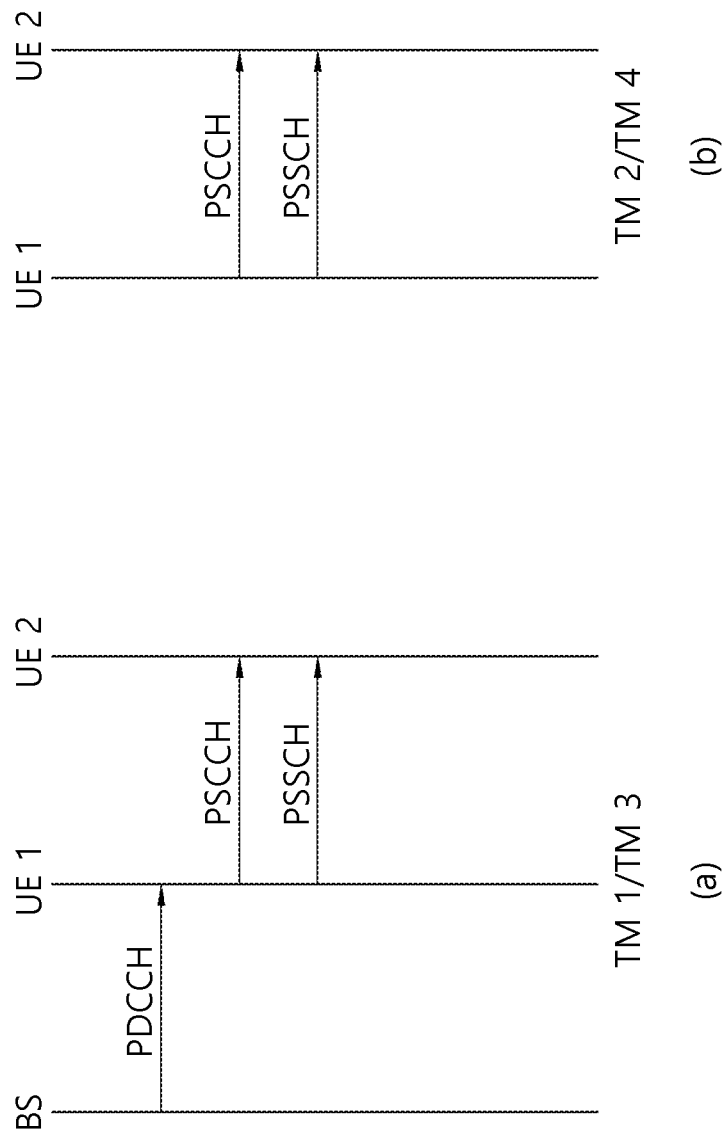
FIG. 13 shows UE operations according to a transmission mode (TM) being related to sidelink/V2X communication, in accordance with an embodiment of the present disclosure.

FIG. 13 shows UE operations according to a transmission mode (TM) being related to sidelink/V2X communication, in accordance with an embodiment of the present disclosure.

(a) of FIG. 13 shows UE operations being related to transmission mode 1 or transmission mode 3, and (b) of FIG. 13 shows UE operations being related to transmission mode 2 or transmission mode 4.

Referring to (a) of FIG. 13, in transmission modes 1/3, the BS performs resource scheduling to UE1 via PDCCH (more specifically, DCI), and UE1 performs sidelink/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). In case of an LTE sidelink, transmission mode 1 may be applied to a general sidelink communication, and transmission mode 3 may be applied to a V2X sidelink communication.

Referring to (b) of FIG. 13, in transmission modes 2/4, the UE may schedule resources on its own. More specifically, in case of LTE sidelink, transmission mode 2 may be applied to a general sidelink communication, and the UE may select a resource from a predetermined resource pool on its own and may then perform sidelink operations. Transmission mode 4 may be applied to a V2X sidelink communication, and the UE may carry out a sensing/SA decoding procedure, and so on, and select a resource within a selection window on its own and may then perform V2X sidelink operations. After transmitting the SCI to UE2 via PSCCH, UE1 may transmit SCI-based data via PSSCH. Hereinafter, the transmission mode may be abbreviated to mode.

In case of NR sidelink, at least two types of sidelink resource allocation modes may be defined. In case of mode 1, the BS may schedule sidelink resources that are to be used for sidelink transmission. In case of mode 2, the user equipment (UE) may determine a sidelink transmission resource from sidelink resources that are configured by the BS/network or predetermined sidelink resources. The configured sidelink resources or the pre-determined sidelink resources may correspond to a resource pool. For example, in case of mode 2, the UE may autonomously select a sidelink resource for transmission. For example, in case of mode 2, the UE may assist (or help) sidelink resource selection of another UE. For example, in case of mode 2, the UE may be configured with an NR configured grant for sidelink transmission. For example, in case of mode 2, the UE may schedule sidelink transmission of another UE. And, mode 2 may at least support reservation of sidelink resources for blind retransmission.

Procedures related to sensing and resource (re-)selection may be supported in resource allocation mode 2. The sensing procedure may be defined as a process decoding the SCI from another UE and/or sidelink measurement. The decoding of the SCI in the sensing procedure may at least provide information on a sidelink resource that is being indicated by a UE transmitting the SCI. When the corresponding SCI is decoded, the sensing procedure may use L1 SL RSRP measurement, which is based on SL DMRS. The resource (re-)selection procedure may use a result of the sensing procedure in order to determine the resource for the sidelink transmission.

Figure 14:
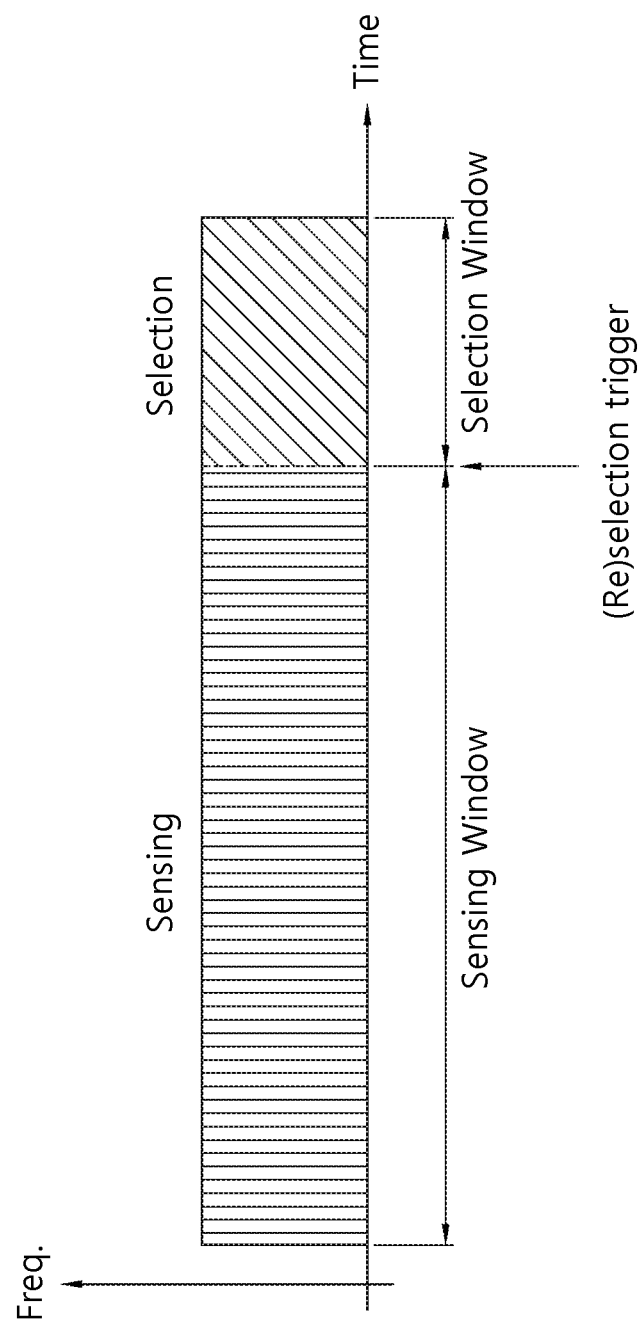
FIG. 14 illustrates an example that a transport resource is selected to which an embodiment of the present disclosure may be applied.

FIG. 14 illustrates an example that a transport resource is selected to which an embodiment of the present disclosure may be applied.

Referring to FIG. 14, a UE may identify transport resources reserved by another UE or resources used by another UE through sensing in a sensing window, and after excluding these in a selection window, select a resource randomly in resources having small interference among the remaining resources.

For example, in the sensing window, the UE may decode a PSCCH that includes information for periods of reserved resources and measure a PSSCH RSRP in the determined resources periodically based on the PSCCH. The UE may exclude resources of which the PSSCH RSRP values exceed a threshold value in the selection window. Later, the UE may randomly select a Sidelink resource among the remaining resources in the selection window.

Alternatively, the UE may measure Received signal strength indication (RSSI) of periodic resources in the sensing window and determine resources having small interference (e.g., resources corresponding to lower 20%). Alternatively, the UE may also randomly select a Sidelink resource in the resources included in the selection window among the periodic resources. For example, in the case that the UE fails to decode the PSCCH, the UE may use the method above.

Hereinafter, a Cooperative Awareness Message (CAM) and a Decentralized Environmental Notification Message (DENM) are described.

In a communication between vehicles, a CAM of periodic message type, a DENM of event triggered message type, and the like may be transmitted. The CAM may include dynamic state information of a vehicle such as a direction and a velocity, vehicle static data such as a size and basic vehicle information such as external lighting state, path history, and the like. A size of the CAM may be 50 to 300 bytes. The CAM is broadcasted, and the latency needs to be smaller than 100 ms. The DENM may be a message generated in an accidental situation such as a breakdown or an accident of a vehicle. A size of the DENM may be smaller than 3000 bytes, and all vehicles in a transmission range may receive the message. In this case, the DENM may have higher priority than the CAM.

Hereinafter, a carrier reselection is described.

A carrier reselection for V2X/Sidelink communication may be performed in MAC layer based on Channel Busy Ratio (CBR) of configured carriers and Prose Per-Packet Priority (PPPP) of a V2X message to be transmitted.

The CBR may mean the portion of sub-channels in a resource pool which is sensed in which S-RSSI measured by a UE exceeds a preconfigured threshold value. The PPPP related to each logical channel may be existed, and the latency required for both UE and BS needs to be reflected on a configuration of PPPP value. When subcarrier is reselected, the UE may selection one or more carriers among candidate carriers in an order increasing from the lowest CBR.

Figure 15:
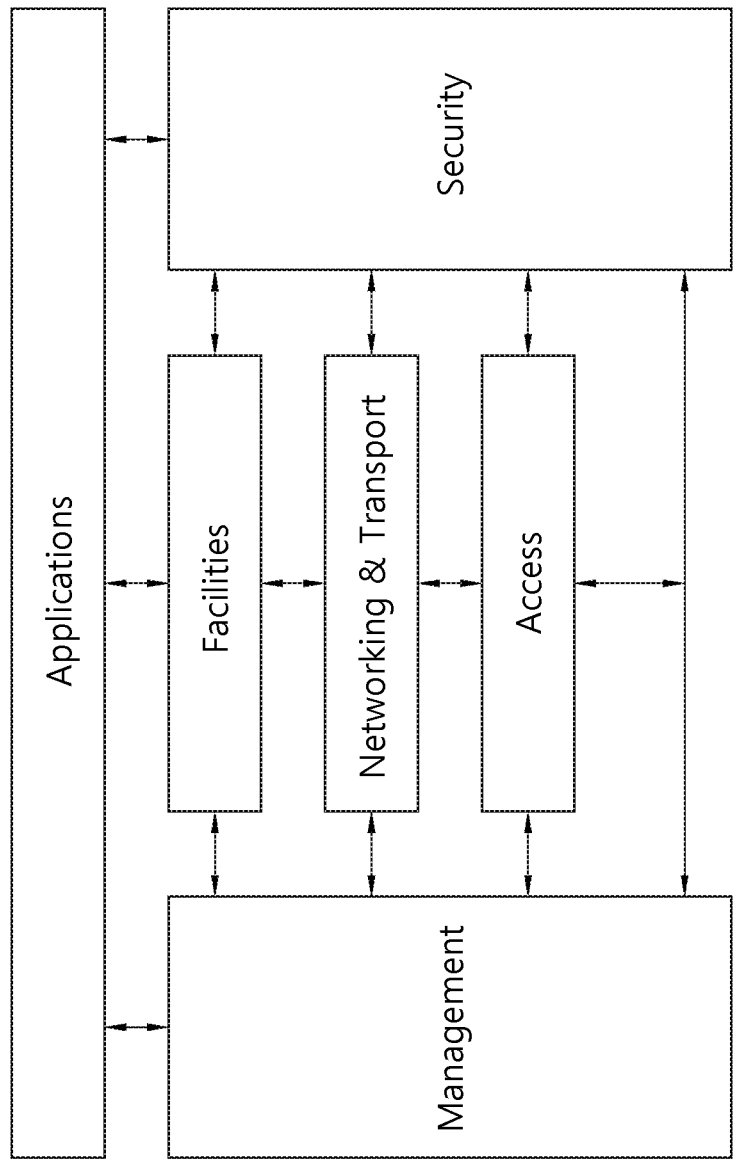
FIG. 15 illustrates an example of components of ITS-station reference architecture to which an embodiment of the present disclosure may be applied.

FIG. 15 illustrates an example of components of ITS-station reference architecture to which an embodiment of the present disclosure may be applied. Here, the ITS-station reference architecture follows a theory of the OSI model for an interlayer communication protocol which is extended to include the ITS application.

Referring to FIG. 15, an access entity may include a function of OSI communication protocol stack related to OSI layers 1 and 2. A network and transport entity may include a function of OSI communication protocol stack related to OSI layers 3 and 4. A facilities entity may include a function of OSI communication protocol stack related to OSI layers 5, 6 and 7. An application entity may be an entity which is connected to one or more different ITS-station applications using an ITS-station service. For example, the application entity may configure an ITS application that provides an ITS service to an ITS user by associating a server application and a client application. A management entity may be an entity that manages an overall communication. For example, the management entity may provide an access authority to management information base (MIB). A security entity may be an entity that provides a security service to the OSI communication protocol stack and the management entity. The security entity may be a part of the management entity. Each of the entities may be interconnected through an interface, service access points (SAPs) or application programming interfaces (APIs).

Meanwhile, in the intelligent transport system (ITS), the ITS-station may include a mounting device installed in a vehicle, a base station installed on a road, a traffic control/management system in a service center, and a portable UE. Particularly, a vulnerable road user (VRU) may be a non-motorised ITS-station. That is, a VRU may include ITS-stations of which mobility and directionality are relatively lower than a vehicle. For example, a VRU may include a portable UE used by a pedestrian and a communication device installed on a bicycle.

In the case that a VRU is the portable UE used by a pedestrian, the wireless communication scheme (RAT) used by the portable UE may be 3GPP. On the other hand, the wireless communication scheme used by the software installed on the corresponding portable UE may be 3GPP. In this case, the packet priority identifier of a higher layer and the packet priority identifier of an access layer may be different. That is, when 802.11 higher layer of the software installed on the portable UE transfers a traffic class (TC) to 3GPP access layer, the packet priority identifier of 802.11 may be TC. However, the packet priority identifier of 3GPP access layer may be the PPPP. As such, since a portable UE uses different packet priority identifiers, the operation of identifying the packet priority identifier may not be properly performed. Accordingly, a portable UE needs to map different packet priority identifiers to identify a packet priority. Hereinafter, according to an embodiment of the present disclosure, it is described a method for a network node to map different packet priority identifiers and an apparatus for supporting the same. In the present disclosure, the access layer may include layer 1 and layer 2. For example, in the case of using Sidelink, the access layer may include PDCP, RLC, MAC and PHY layers. In addition, the higher layer may use geonetworking function as a network and transport protocol and a basic transport protocol. The higher layer may use IP as a network protocol and use TCP/UDP as a transport protocol. The higher layer may refer the facilities layer or the application layer.

Further, a network may indicate a network node that needs to use two mapping schemes. It may be determined whether it is the network node that needs to use two mapping schemes by a basic priority list. Here, the basic priority list may include information for the packet priority identifier and preconfigured by the network node.

Figure 16:
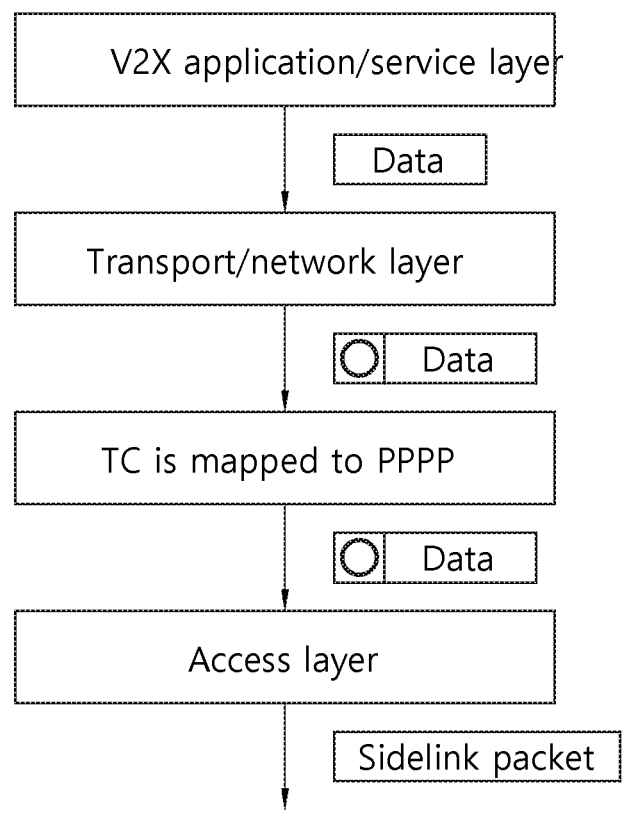
FIG. 16 illustrates an example that a packet is transferred from a higher layer to a lower layer based on mapping between the TC and the PPPP according to an embodiment of the present disclosure.

FIG. 16 illustrates an example that a packet is transferred from a higher layer to a lower layer based on mapping between the TC and the PPPP according to an embodiment of the present disclosure.

Referring to FIG. 16, a data packet may be transferred from a V2X application/service layer to the transport/network layer. In addition, in the transport/network layer, a header of the transport/network layer may be added to the data packet. For example, the header of the transport/network layer may include a value related to TC. In addition, a first apparatus 100 may configure a mapping table between the TC and the PPPP. The first apparatus 100 may derive or determine a PPPP value which is mapped to the TC related to the corresponding data packet based on the mapping table. For example, whenever the first apparatus 100 receives an individual data packet to be transmitted from a higher layer, the first apparatus 100 may derive or determine a PPPP value which is mapped to the TC related to the corresponding data packet based on the mapping table. For example, the TC may display or include a header of the received individual packet. The PPPP value and the data packet which are derived or determined may be transmitted to the access layer (e.g., PDCP layer). Later, the first apparatus 100 may transmit the packet to a second apparatus 200 through Sidelink by applying the derived PPPP.

Figure 17:
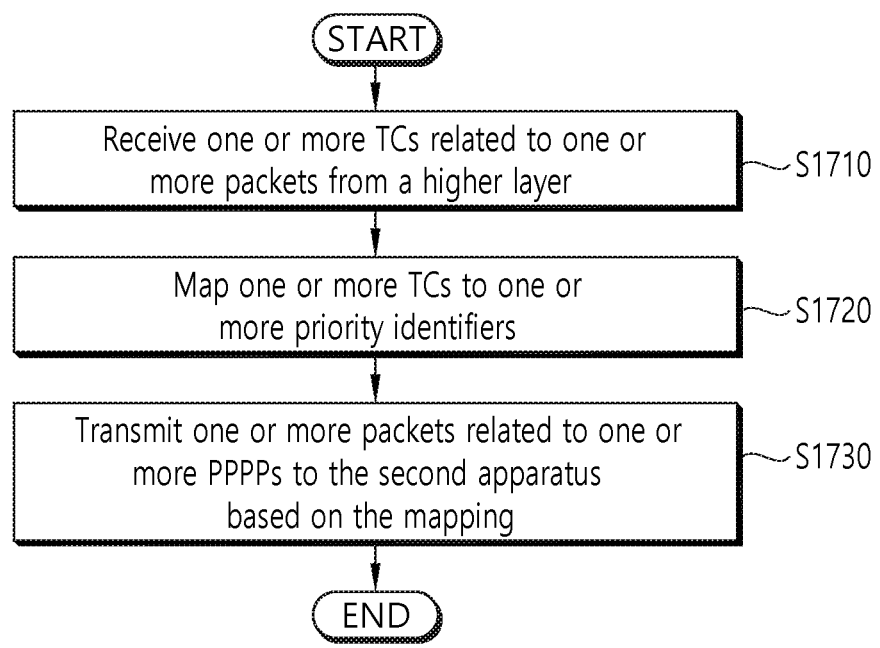
FIG. 17 illustrates a procedure that the first apparatus 100 transmits one or more packets from a higher layer to the access layer based on mapping for different packet priority identifiers according to an embodiment of the present disclosure.
Figure 18:
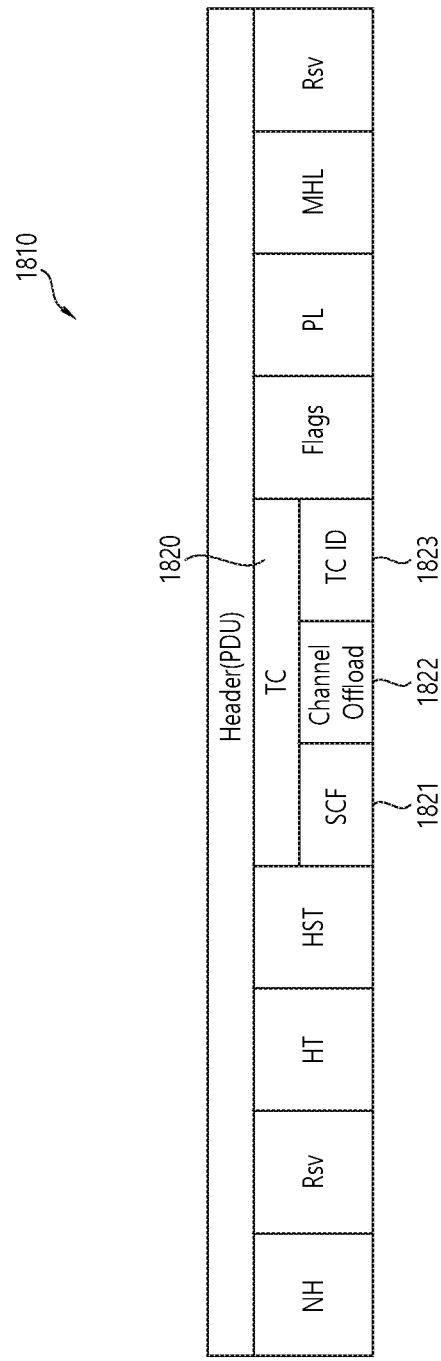
FIG. 18 illustrates an example of a PDU header transferred to a lower layer according to an embodiment of the present disclosure.

FIG. 17 illustrates a procedure that the first apparatus 100 transmits one or more packets from a higher layer to the access layer based on mapping for different packet priority identifiers according to an embodiment of the present disclosure. FIG. 18 illustrates an example of a PDU header transferred to a lower layer according to an embodiment of the present disclosure.

Referring to FIG. 17, in step S1710, the first apparatus 100 may receive one or more TCs related to one or more packets from a higher layer. Here, the higher layer may represent a higher layer for the access layer to which the TC is transmitted. In addition, the higher layer may use the TC to determine a priority of a packet. For example, the higher layer may use the TC to be able to determine a priority of a packet to adjust a differentiated traffic (i.e., determine a priority of traffic including a congestion control).

For example, in the case that the facilities layer transmits data to a lower layer (e.g., transport layer), TC information may be transmitted. Here, the facilities layer may transmit information as represented in Table 3 (e.g., networking and transport to facilities service access point (NF-SAP)) to a basic transport protocol (BTP) layer.

TABLE 3

| BTP-DATA.request |
|---|
| BTP typeSource port (o) |
| Destination port |
| Destination port info (o) |
| GN Packet transport type |
| GN Destination address |
| GN Communication profile |
| GN Security profile (o) |
| GN Maximum packet lifetime (o) |
| GN Repetition interval (o) |
| GN Maximum repetition time (o) |
| GN Maximum hop limit (o) |
| GN Traffic class |
| Length |
| Data (FPDU) |

For example, in the case that the transport and network layer transmits data to a lower layer (e.g., network layer), the TC information may be transmitted. Here, the transport layer may transmit information as represented in Table 4 (e.g., geonetworking service access point (GN-SAP)) to a geonetworking layer.

TABLE 4

| GN-DATA.request | |
|---|---|
| Upper protocol entity | Packet transport type |
| Destination address | |
| Communication profile | |
| Security profile (o) | |
| ITS-AID length (o) | |
| ITS-AID (o) | |
| Security permissions length (o) | |
| Security permissions (o) | |
| Security context information (o) | |
| Security target ID list length (o) | |
| Security target ID list (o) | |
| Maximum packet lifetime (o) | |
| Repetition interval (o) | |
| Maximum repetition time (o) | |
| Maximum hop limit (o) | |
| Traffic class | |
| Length | |
| Data (Payload of GeoNet Packet, T-SDU/GN6-SDU) | |

For example, the one or more TCs related to one or more packets may be included in a header of PDU transferred from a higher layer to a lower layer. Referring to FIG. 18, a header 1810 of PDU may include a TC 1820. The TC 1820 may include a store-carry-field (SCF) 1821, a Channel Offload 1822 and a TC ID 1823. The SCF 1821 may represent whether a packet needs to be buffered in the case that a proper peripheral value is not present. The Channel Offload 1822 may represent whether a packet may be offloaded to a specific channel or another channel in the TC ID 1823. The TC ID 1823 may represent a traffic class. For example, in the case that the TC ID value is 0, this may represent AC (access category) VO (voice). In the case that the TC ID value is 1, this may represent AC_VI (video). In the case that the TC ID value is 2, this may represent AC_BE (best effort). In the case that the TC ID value is 3 this may represent AC_BK (background). Furthermore, the TC value or a group of the TC values may be allocated to each message, message format or traffic flow. For example, in the ITS-station, the TC values that represent relatively high priorities may be allocated to a DEMN message. That is, among one or more TCs, at least one TC, which has a higher priority value than a predetermined priority threshold value, may be determined. Such at least one TC may be allocated to the DEMN message. For example, in the ITS-station, the TC values that represent relatively low priority may be allocated to a CAM message. That is, among one or more TCs, at least one TC, which has a lower priority value than a predetermined priority threshold value, may be determined. Such at least one TC may be allocated to the CAM message.

According to an embodiment, a higher layer may be used as a decentralized congestion control (DCC) profile. For example, a higher layer may use the DCC profile to be able to determine a priority of a packet to adjust a differentiated traffic (i.e., determine a priority of traffic including a congestion control). Here, each DCC profile may be identified by a DCC profile ID (hereinafter, DP-ID). The DP-ID value or a group of the DP-ID values may be allocated to a message format or traffic flow. For example, in the ITS-station, the DP-ID values to which relatively alleviated congestion control is added may be allocated to the DEMN message. That is, among one or more DP-ID values, at least one DP-ID, which has a lower congestion control value than a predetermined congestion control threshold value, may be determined. Such at least one DP-ID may be allocated to the DEMN message. For example, in the ITS-station, the DP-ID values to which relatively severe congestion control is added may be allocated to the CAM message. That is, among one or more DP-ID values, at least one DP-ID, which has a higher congestion control value than a predetermined congestion control threshold value, may be determined. Such at least one DP-ID may be allocated to the CAM message. Owing to this, when an emergency message or a message of which importance is high is congested, a probability of successful transmission thereof may be increased.

Referring to FIG. 17, in step S1720, the first apparatus 100 may map one or more TCs to one or more priority identifiers. For example, one or more TCs may be mapped to one or more priority identifiers. For example, the access layer may use a priority identifier for each packet to determine a priority of a packet. Here, the priority identifier for each packet may include a PPPP, a QoS class identifier (QCI) or a 5G QoS indicator (5QI). For example, in the PC5 interface of 3GPP used in the V2X Sidelink communication, the access layer may use the PPPP to determine a priority of a packet. That is, in the case that different packet priority identifiers are used in a higher layer and the access layer, the first apparatus 100 may map the different packet priority identifiers.

More particularly, the first apparatus 100 may configure a mapping table between the TC and the PPPP. Whenever the first apparatus 100 receives an individual data packet to be transmitted from a higher layer, the first apparatus 100 may derive or determine a PPPP value which is mapped to the TC related to the corresponding data packet based on the mapping table. For example, the TC may display or include a header of the received individual packet. The data packet related to the derived PPPP may be transmitted to the access layer (e.g., PDCP layer). Later, the first apparatus 100 may transmit the packet to the second apparatus 200 through Sidelink by applying the derived PPPP.

For example, the mapping function may reside in the PDCP layer. In addition, the mapping function may reside in a new layer that provides the mapping function for the priority identifier between the PDCP layer and a higher layer.

For example, the mapping information may be preconfigured in the first apparatus 100. For example, in the factory setting, the first apparatus 100 may be configured with the mapping information. Here, the mapping information may include information for one or more PPPPs related to one or more TCs. For example, in the case that the first apparatus 100 accesses initially to a network, the mapping information may be loaded from USIM/UICC. For example, in the case of the ITS application, the mapping information may be provided from a V2X control function or a server such as a V2X application server. For example, the mapping information may be provided from a base station through a control signaling (e.g., RRC signaling or dedicated signaling). For example, the mapping information may be configured by pre-specified values.

Examples for the mapping scheme between the TC and the PPPP are as below. For example, each TC may be related to one PPPP/or mapping scheme that each PPPP is related to one TC. That is, mapping between the TC and the PPP may be one-to-one mapping. For example, each TC may be related to one PPPP/or mapping scheme that each PPPP is related to a plurality of TCs. For example, each PPPP may be related to one TC/or mapping scheme that each TC is related to a plurality of PPPPs. For example, it is the mapping scheme that at least one TC and at least one PPPP are associated. In the case that one PPPP and a plurality of TCs are mapped, the first apparatus 100 may determine or derive a TC value having the highest priority from a plurality of TCs for a packet of the PPPP. In addition, in the case that one TC and a plurality of PPPPs are mapped, the first apparatus 100 may determine or derive a PPPP value having the highest priority from a plurality of PPPPs for a packet of the PPPP as a PPPP to apply to the packet of TC.

According to an embodiment, the mapping scheme between the TC and the PPPP may be as represented in Table 5.

TABLE 5

| TC | PPPP | Purpose of use |
|---|---|---|
| 0 | 2 | DEMN message of high priority |
| 1 | 4 | Normal DEMN message |
| 2 | 5 | CAM message |
| 3 | 7 | Transmitted DENM message and other message of low priority |

Referring to Table 5, for example, in the case that a TC value is 0, the TC may be mapped to the PPPP of which PPPP value is 2. Here, the TC mapped to the PPPP having value 2 may be allocated to DEMN message of high priorities. For example, in the case that a TC value is 1, the TC may be mapped to the PPPP of which PPPP value is 4. Here, the TC mapped to the PPPP having value 4 may be allocated to normal DEMN messages. For example, in the case that a TC value is 2, the TC may be mapped to the PPPP of which PPPP value is 5. Here, the TC mapped to the PPPP having value 5 may be allocated to CAM messages. For example, in the case that a TC value is 3, the TC may be mapped to the PPPP of which PPPP value is 7. Here, the TC mapped to the PPPP having value 7 may be allocated to DEMN messages and other message of low priorities. According to an embodiment, the packet priority identifier transmitted from a higher layer may be the DP-ID. In such a case, like the case that the packet priority identifier described above is the TC, the first apparatus 100 may map one or more DP-IDs and one or more PPPPs. Likewise, a method for the first apparatus 100 to obtain the mapping information between the DP-ID and the PPPP and the mapping scheme between the DP-ID and the PPPP may be the same as the case that the packet priority identifier described above is the TC.

Referring to FIG. 17, in step S1730, the first apparatus 100 may transmit one or more packets related to one or more PPPPs to the second apparatus 200 based on the mapping. For example, in the case that the first apparatus 100 transmits one or more packets to the second apparatus 200, the packets in which processes are completed in a higher layer of the access layer based on the mapping may be transmitted to the access layer. Particularly, in the case that the access layer (e.g., sublayer of layer 1 or layer 2) requests a PPPP value of a packet to be transmitted, if the packet priority identifiers are different in the access layer and the higher layer, the first apparatus 100 may derive a virtual PPPP value based on the mapping between the TC and the PPPP. Later, the first apparatus 100 may configure the PPPP required in the associated access layer as the derived virtual PPPP value.

Furthermore, for example, in the case that the DP-ID and the PPPP are mapped, the first apparatus may derive a virtual PPPP value based on the mapping between the DP-ID and the PPPP. Later, the first apparatus 100 may configure the PPPP required in the associated access layer as the derived virtual PPPP value.

Figure 19:
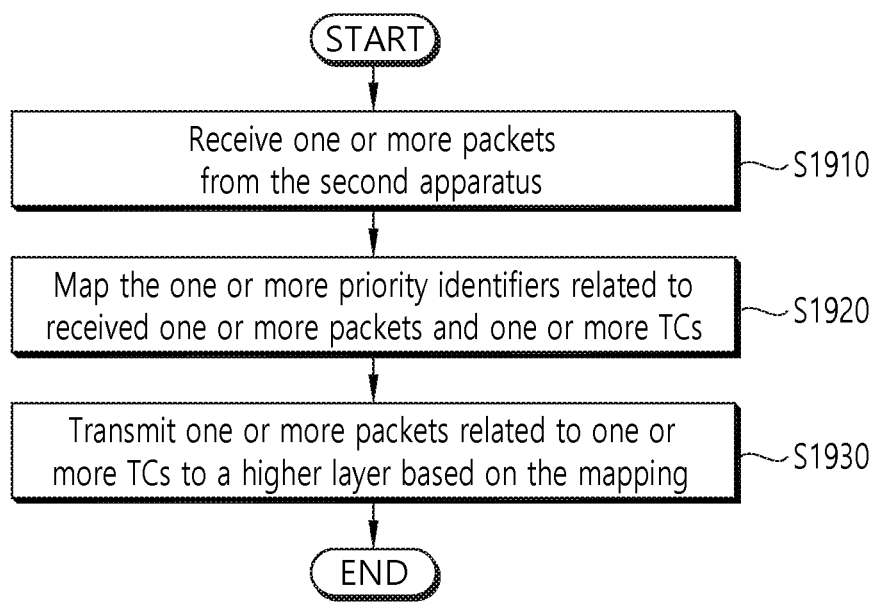
FIG. 19 illustrates a procedure that the first apparatus 100 transmits one or more packets from the access layer to a higher layer based on mapping for different packet priority identifiers according to an embodiment of the present disclosure.

FIG. 19 illustrates a procedure that the first apparatus 100 transmits one or more packets from the access layer to a higher layer based on mapping for different packet priority identifiers according to an embodiment of the present disclosure.

Referring to FIG. 19, in step S1910, the first apparatus 100 may receive one or more packets from the second apparatus 200. For example, the access layer may use a priority identifier for each packet to determine a priority of a packet. Here, the priority identifier for each packet may include a PPPP, a QoS class identifier (QCI) or a 5G QoS indicator (5QI). For example, in the PC5 interface of 3GPP used in the V2X Sidelink communication, the access layer may use the PPPP to determine a priority of a packet. That is, in the case that different packet priority identifiers are used in a higher layer and the access layer, the first apparatus 100 may map the different packet priority identifiers.

Furthermore, the higher layer may represent a higher layer for the access layer to which the TC is transmitted. In addition, the higher layer may use the TC to determine a priority of a packet. For example, the higher layer may use the TC to be able to determine a priority of a packet to adjust a differentiated traffic (i.e., determine a priority of traffic including a congestion control). Furthermore, the TC value or a group of the TC values may be allocated to each message, message format or traffic flow. For example, in the ITS-station, the TC values that represent relatively high priorities may be allocated to a DEMN message. That is, among one or more TCs, at least one TC, which has a higher priority value than a predetermined priority threshold value, may be determined. Such at least one TC may be allocated to the DEMN message. For example, in the ITS-station, the TC values that represent relatively low priority may be allocated to a CAM message. That is, among one or more TCs, at least one TC, which has a lower priority value than a predetermined priority threshold value, may be determined. Such at least one TC may be allocated to the CAM message.

Referring to FIG. 19, in step S1920, the first apparatus 100 may map the one or more priority identifiers related to received one or more packets and one or more TCs. For example, one or more PPPPs related to one or more packets may be mapped to one or more TCs. For example, the mapping function may reside in the PDCP layer. In addition, the mapping function may reside in a new layer that provides the mapping function for the priority identifier between the PDCP layer and a higher layer.

For example, the mapping information may be preconfigured in the first apparatus 100. For example, in the factory setting, the first apparatus 100 may be configured with the mapping information. Here, the mapping information may include information for one or more PPPPs related to one or more TCs. For example, in the case that the first apparatus 100 accesses initially to a network, the mapping information may be loaded from USIM/UICC. For example, in the case of the ITS application, the mapping information may be provided from a V2X control function or a server such as a V2X application server. For example, the mapping information may be provided from a base station through a control signaling (e.g., RRC signaling or dedicated signaling). For example, the mapping information may be configured by pre-specified values.

Examples for the mapping scheme between the TC and the PPPP are as below. For example, each TC may be related to one PPPP/or mapping scheme that each PPPP is related to one TC. That is, mapping between the TC and the PPP may be one-to-one mapping. For example, each TC may be related to one PPPP/or mapping scheme that each PPPP is related to a plurality of TCs. For example, each PPPP may be related to one TC/or mapping scheme that each TC is related to a plurality of PPPPs. For example, it is the mapping scheme that at least one TC and at least one PPPP are associated. In the case that one PPPP and a plurality of TCs are mapped, the first apparatus 100 may determine or derive a TC value having the highest priority from a plurality of TCs for a packet of the PPPP. In addition, in the case that one TC and a plurality of PPPPs are mapped, the first apparatus 100 may determine or derive a PPPP value having the highest priority from a plurality of PPPPs for a packet of the PPPP as a PPPP to apply to the packet of TC.

According to an embodiment, referring to Table 5 described above, the mapping scheme between the TC and the PPPP may be as below. For example, in the case that a PPPP value is 2, the PPPP may be mapped to the TC of which TC value is 0. Here, the mapped TC may be allocated to DEMN message of high priorities. For example, in the case that a PPPP value is 4, the PPPP may be mapped to the TC of which TC value is 1. Here, the mapped TC may be allocated to normal DEMN messages. For example, in the case that a PPPP value is 5, the PPPP may be mapped to the TC of which TC value is 2. Here, the mapped TC may be allocated to CAM messages. For example, in the case that a PPPP value is 7, the PPPP may be mapped to the TC of which TC value is 3. Here, the mapped TC may be allocated to DEMN messages and other message of low priorities.

Referring to FIG. 19, in step S1930, the first apparatus may transmit one or more packets related to one or more TCs to a higher layer based on the mapping. For example, the first apparatus 100 may receive one or more packets from the second apparatus 200. And, in layer 1 and layer 2, PDCP SDU or network layer packets are generated, and the processing may be completed. Later, based on the mapping, the packets related to one or more TCs may be transmitted to a higher layer. For example, the packet priority identifiers may be different in the access layer and the higher layer. In such a case, the first apparatus may derive a virtual TC value based on the mapping between the TC and the PPPP. Later, the first apparatus 100 may configure the TC required in the related higher layer as the derived virtual TC value.

In addition, for example, in the case that the DP-ID and the PPPP are mapped, the first apparatus 100 may derive a virtual DP-ID value based on the mapping between the DP-ID and the PPPP. Later, the first apparatus 100 may configure the DP-ID required in the related higher layer as the derived virtual DP-ID value.

According to an embodiment, the packet priority identifier requested in a higher layer may be the DP-ID. In such a case, like the case that the packet priority identifier described above is the TC, the first apparatus 100 may map one or more DP-IDs and one or more PPPPs. Likewise, a method for the first apparatus 100 to obtain the mapping information between the DP-ID and the PPPP and the mapping scheme between the DP-ID and the PPPP may be the same as the case that the packet priority identifier described above is the TC.

Additionally, it is described the content for the PPPP of not a V2X Sidelink communication. For example, in the case that a UE operates in a coverage, eight transmission pools may be provided by RRC signaling. In addition, in the case that a UE operates out of a coverage, eight transmission pools may be preconfigured. Here, each of the transmission pools may be associated with one or more PPPPs. For MAC PDU transmission, the UE may select a transmission pool which is associated with the PPPP. For example, the PPPP associated with a transmission pool may be the same as the PPPP of a logical channel having the highest PPPP among a logical channel which is identified in the MAC PDU. A method for the UE to select a transmission pool among a plurality of transmission pools having the same associated PPPP may be changed according to a UE implementation. One-to-one correspondence may be present between a Sidelink control pool and a Sidelink data pool.

Further, it is described the content for the PPPP of a V2X Sidelink communication. As access stratum (AS), the PPPP and a PPPR of a PDU may be provided by a higher layer through the PC5 interface. A packet delay budget (PDB) of a PDU may be determined from the PPPP. A low PDB may be mapped to a PPPP value of high priority. A logical channel prioritization of a logical channel based on the PPPP may be used in the V2X Sidelink communication. A carrier selection may be performed in the MAC layer according to the CBR of a carrier configured for the V2X Sidelink communication and the PPPP of a V2X message to be transmitted. For example, the CBR of a carrier may be preconfigured for the V2X Sidelink communication. In the case that a resource selection is triggered, a carrier reselection may be performed. For example, the resource selection is triggered for each Sidelink processor, the carrier reselection may be performed. In order to avoid frequent switching between different carriers, a UE may use the carrier which is already selected for transmission continuously when the CBR measured for the carrier is lower than a preconfigured threshold value. The all selected carriers may have the same synchronization priority configuration or the same synchronization reference. In the case of the UE that uses an autonomous resource selection, a logical channel priority designation may be performed for a Sidelink resource on the carrier according to the CBR measured for the carrier and the PPPP of the Sidelink logical channel.

In addition, in the case that a V2X Sidelink transmission and a UL transmission are overlapped in a time domain while occupying the same frequency, when the PPPP of a Sidelink MAC PDU is lower than the preconfigured PPPP threshold value, the UE may designate the V2X Sidelink transmission prior to the UL transmission. When the PPPP of a Sidelink MAC PDU is higher than the preconfigured PPPP threshold value, the UE may designate the UL transmission prior to the V2X Sidelink transmission.

Furthermore, in the case that a V2X Sidelink transmission and a UL transmission are overlapped in a time domain while occupying different frequencies, when the PPPP of a Sidelink MAC PDU is lower than the preconfigured PPPP threshold value, the UE may designate the V2X Sidelink transmission prior to the UL transmission or decrease a UL transmission power. When the PPPP of a Sidelink MAC PDU is higher than the preconfigured PPPP threshold value, the UE may designate the UL transmission prior to the V2X Sidelink transmission or decrease a V2X Sidelink transmission power. However, in the case that the UL transmission is designated as high priority by a higher layer or the random access procedure is performed, the UE may designate the UL transmission prior to an arbitrary V2X Sidelink transmission (e.g., without regard to the PPPP of the Sidelink MAC PDU).

The examples for the proposed scheme described above may be included as one of the implementation methods of the present disclosure. Accordingly, it is understood that the examples for the proposed scheme may be regarded as a sort of proposed methods. Further, the proposed schemes described above may be implemented independently, but also implemented as a combination (or merge) of a part of proposed schemes. A rule may be defined such that the information on whether to apply the proposed methods (or information for rules of the proposed methods) is informed by a base station to a UE or by a transmission UE to a reception UE through a predefined signal (e.g., physical layer signal or higher layer signal).

Hereinafter, one or more apparatus to which various embodiments of the present disclosure may be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
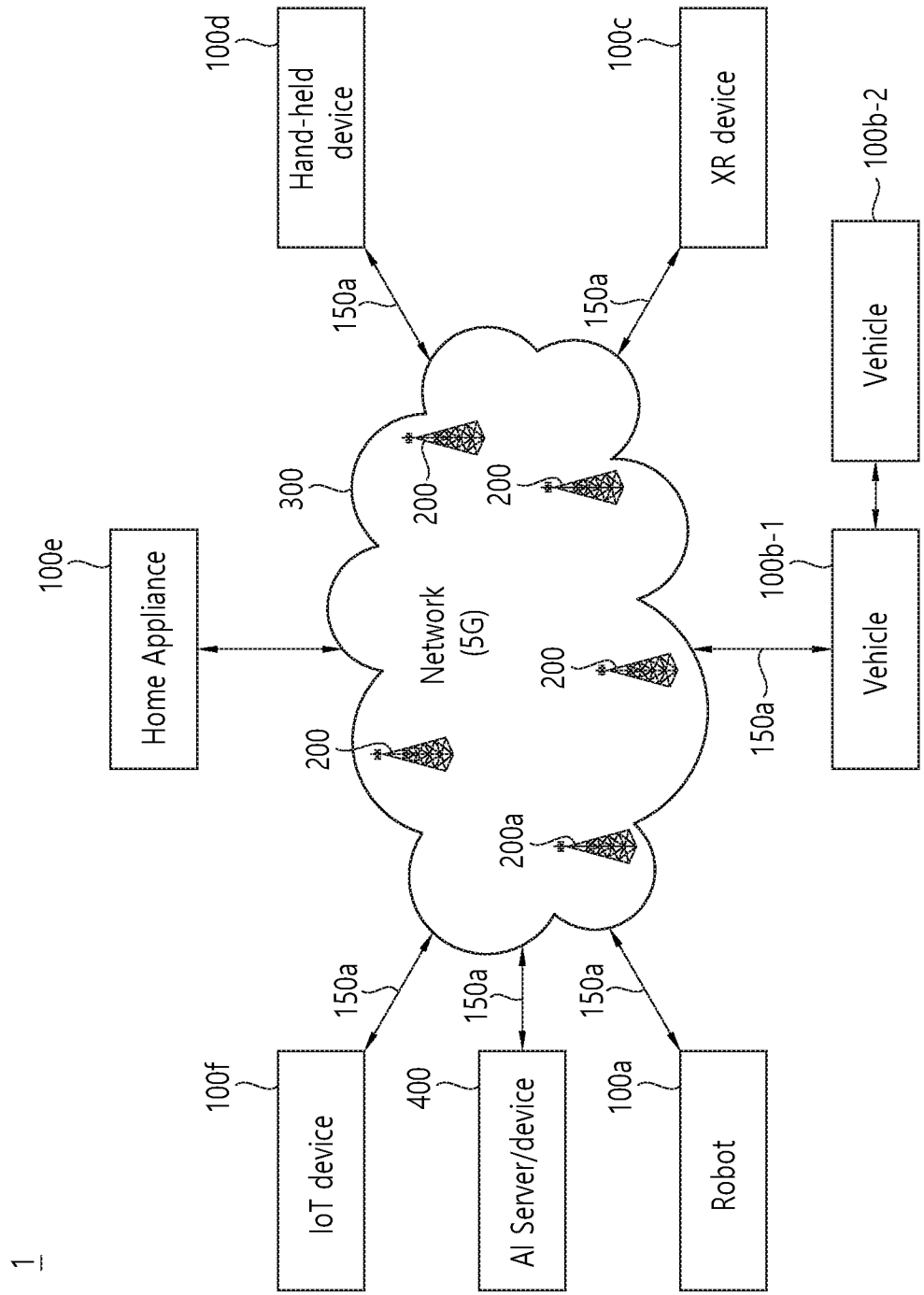
FIG. 20 shows a communication system 1, in accordance with an embodiment of the present disclosure.

FIG. 20 shows a communication system 1, in accordance with an embodiment of the present disclosure.

Referring to FIG. 20, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smart meter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 21:
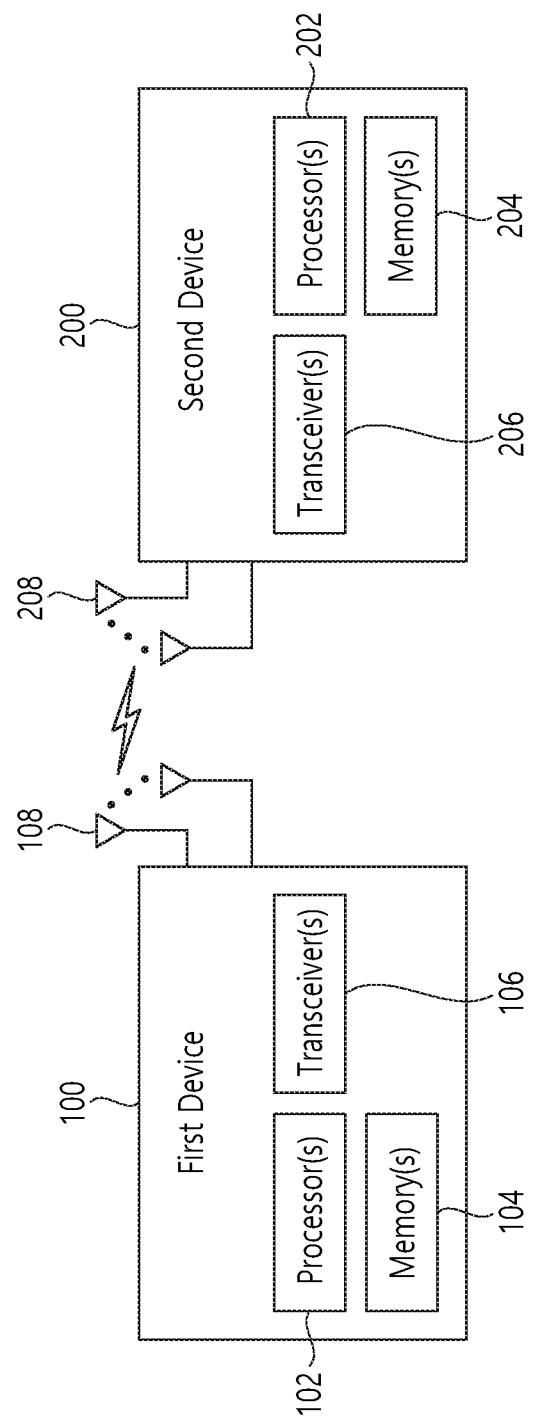
FIG. 21 shows wireless devices, in accordance with an embodiment of the present disclosure.

FIG. 21 shows wireless devices, in accordance with an embodiment of the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 22:
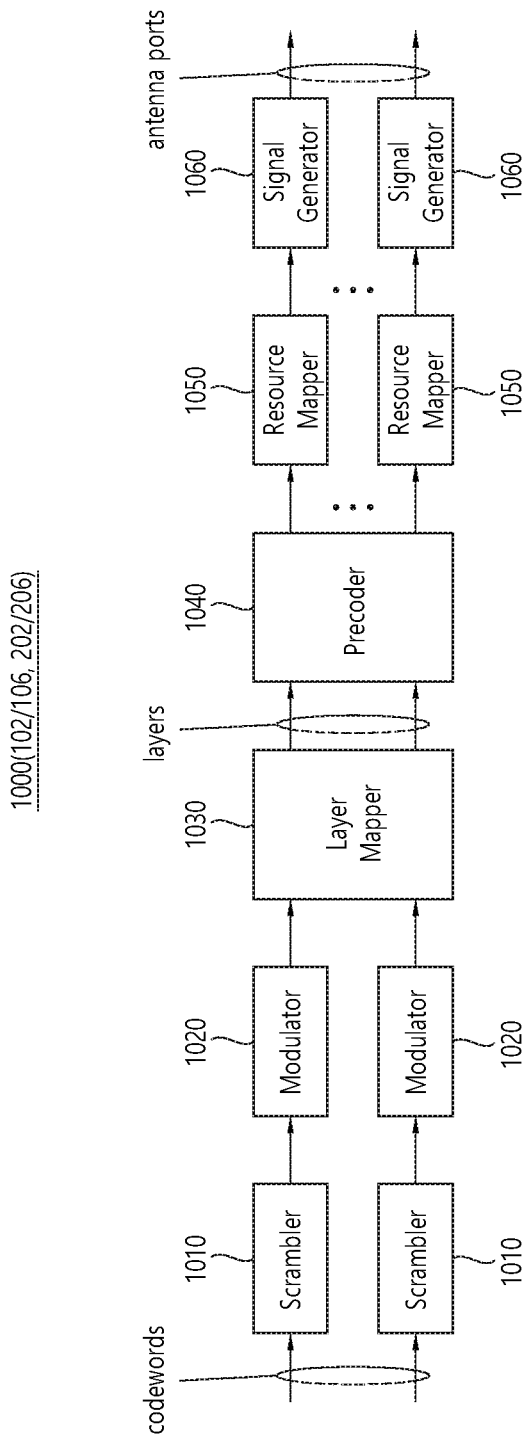
FIG. 22 shows a signal process circuit for a transmission signal, in accordance with an embodiment of the present disclosure.

FIG. 22 shows a signal process circuit for a transmission signal, in accordance with an embodiment of the present disclosure.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 21. For example, the wireless devices (e.g., 100 and 200 of FIG. 20) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 23:
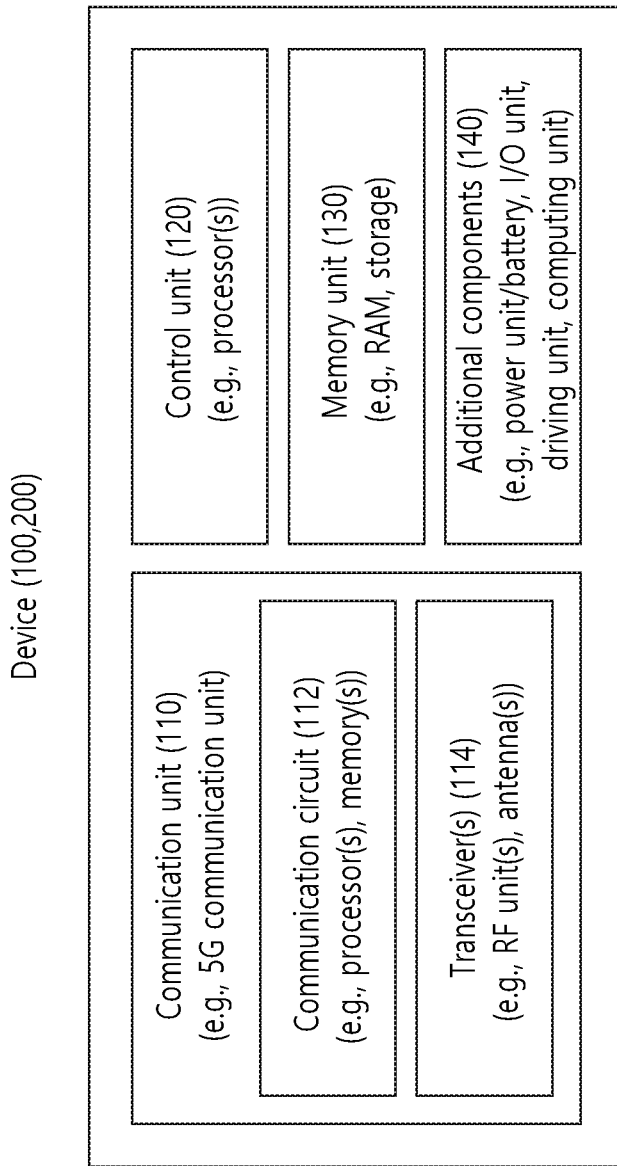
FIG. 23 shows another example of a wireless device, in accordance with an embodiment of the present disclosure.

FIG. 23 shows another example of a wireless device, in accordance with an embodiment of the present disclosure. The wireless device may be implemented in various forms according to a use-case/service (refer to FIG. 24 to FIG. 28).

Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Figure 24:
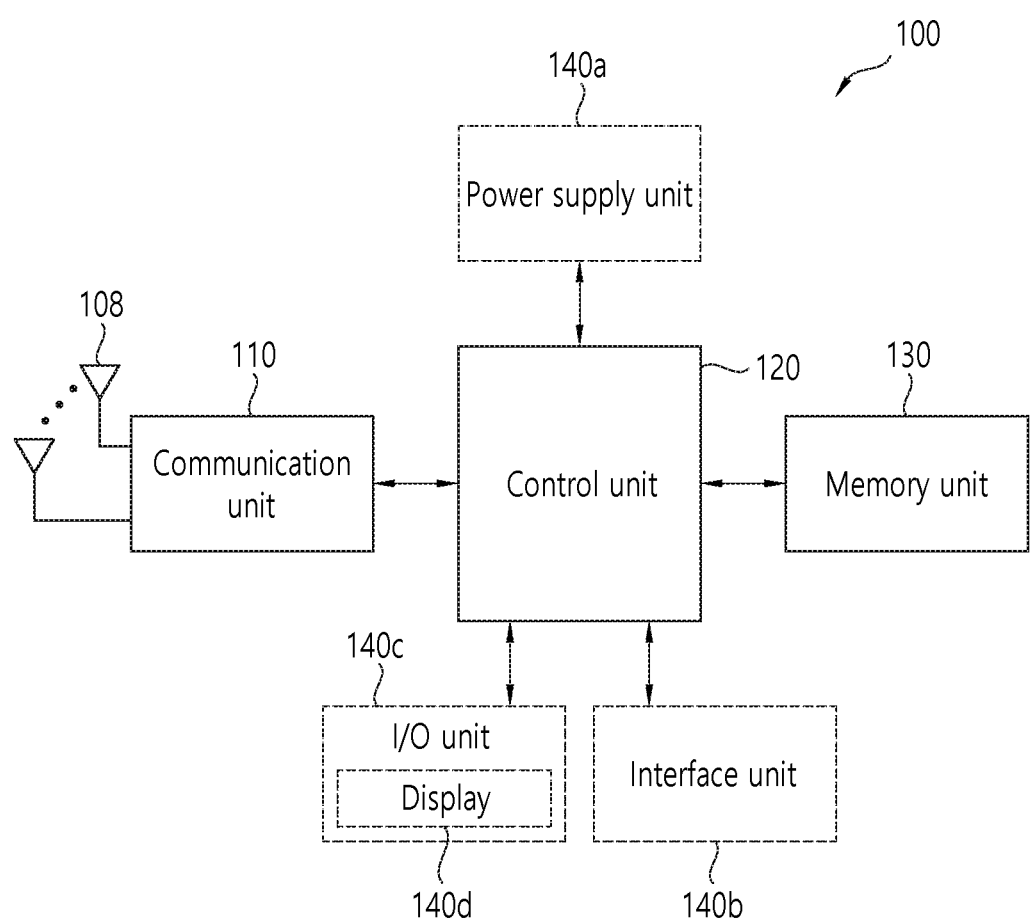
FIG. 24 shows a hand-held device, in accordance with an embodiment of the present disclosure.

FIG. 24 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 25:
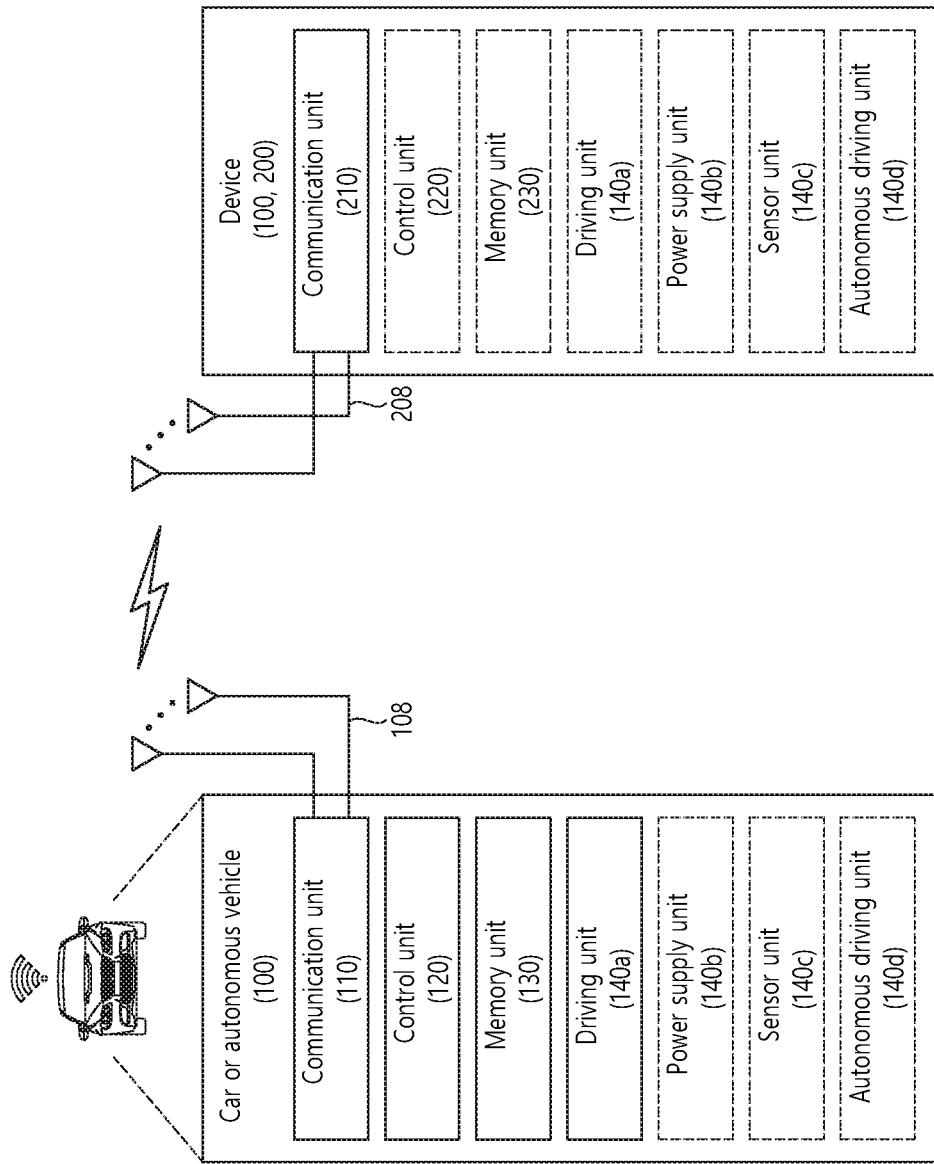
FIG. 25 shows a vehicle or an autonomous driving vehicle, in accordance with an embodiment of the present disclosure.

FIG. 25 shows a vehicle or an autonomous driving vehicle, in accordance with an embodiment of the present disclosure. The vehicle or autonomous driving vehicle may be implemented by a mobile robot, a car, a train, a manned/unmanned Aerial Vehicle (AV), a ship, etc.

Referring to FIG. 25, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 26:
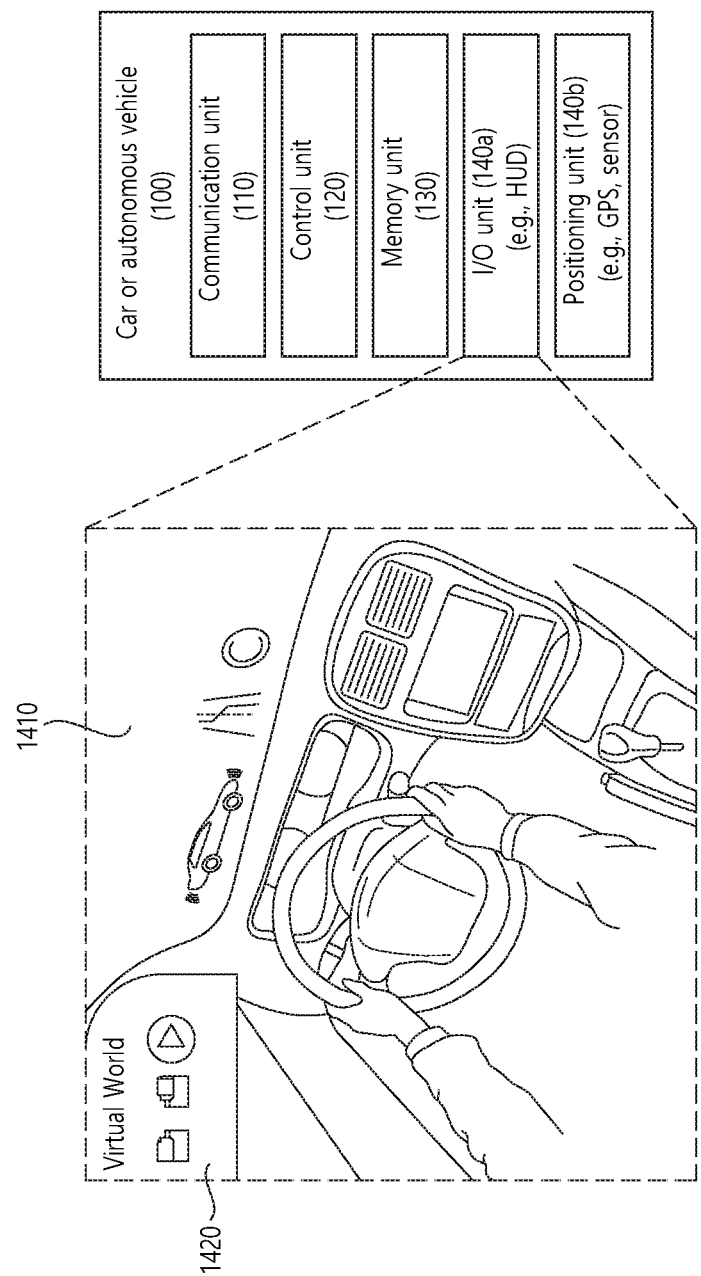
FIG. 26 shows a vehicle, in accordance with an embodiment of the present disclosure.

FIG. 26 shows a vehicle, in accordance with an embodiment of the present disclosure. The vehicle may be implemented as a transport means, an aerial vehicle, a ship, etc.

Referring to FIG. 26, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 23.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Figure 27:
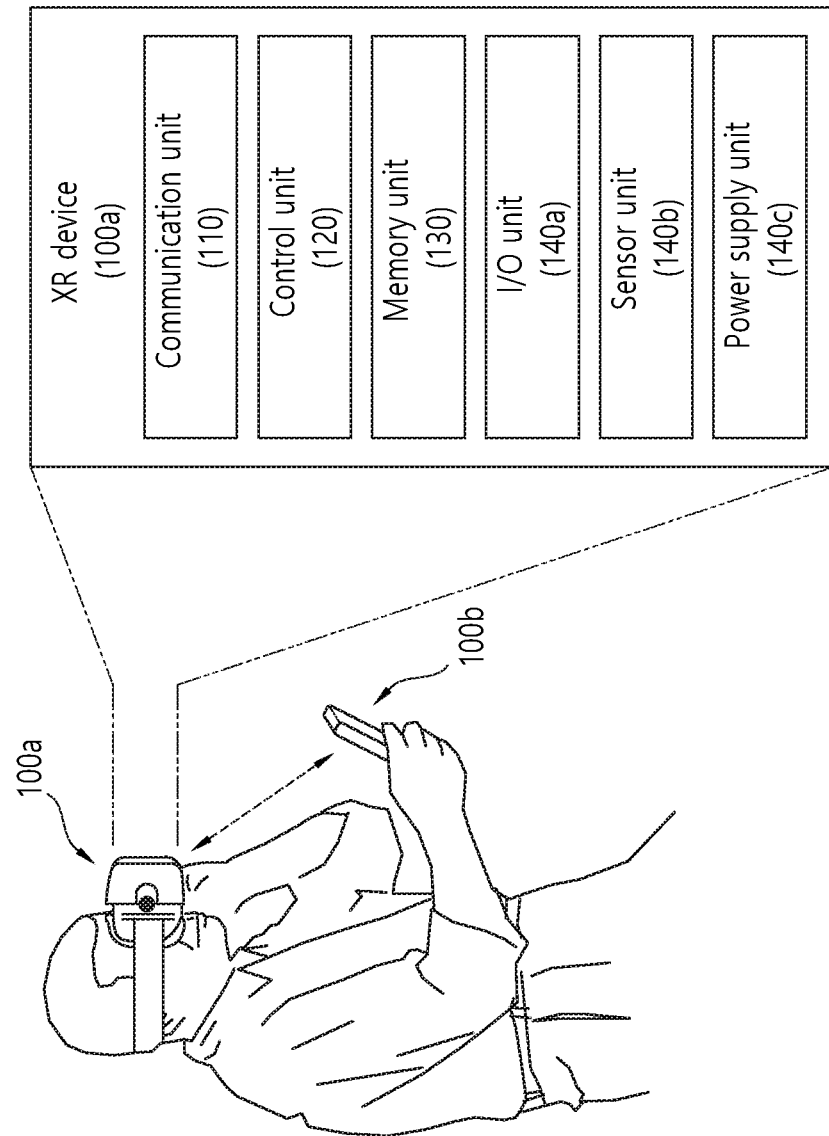
FIG. 27 shows an XR device, in accordance with an embodiment of the present disclosure.

FIG. 27 shows an XR device, in accordance with an embodiment of the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 27, an XR device 100*a* may include a communication unit 110, a control unit 120, a memory unit 130, an I/O unit 140*a*, a sensor unit 140*b*, and a power supply unit 140*c*. Herein, the blocks 110 to 130/140*a* to 140*c* correspond to the blocks 110 to 130/140 of FIG. 23, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

Figure 28:
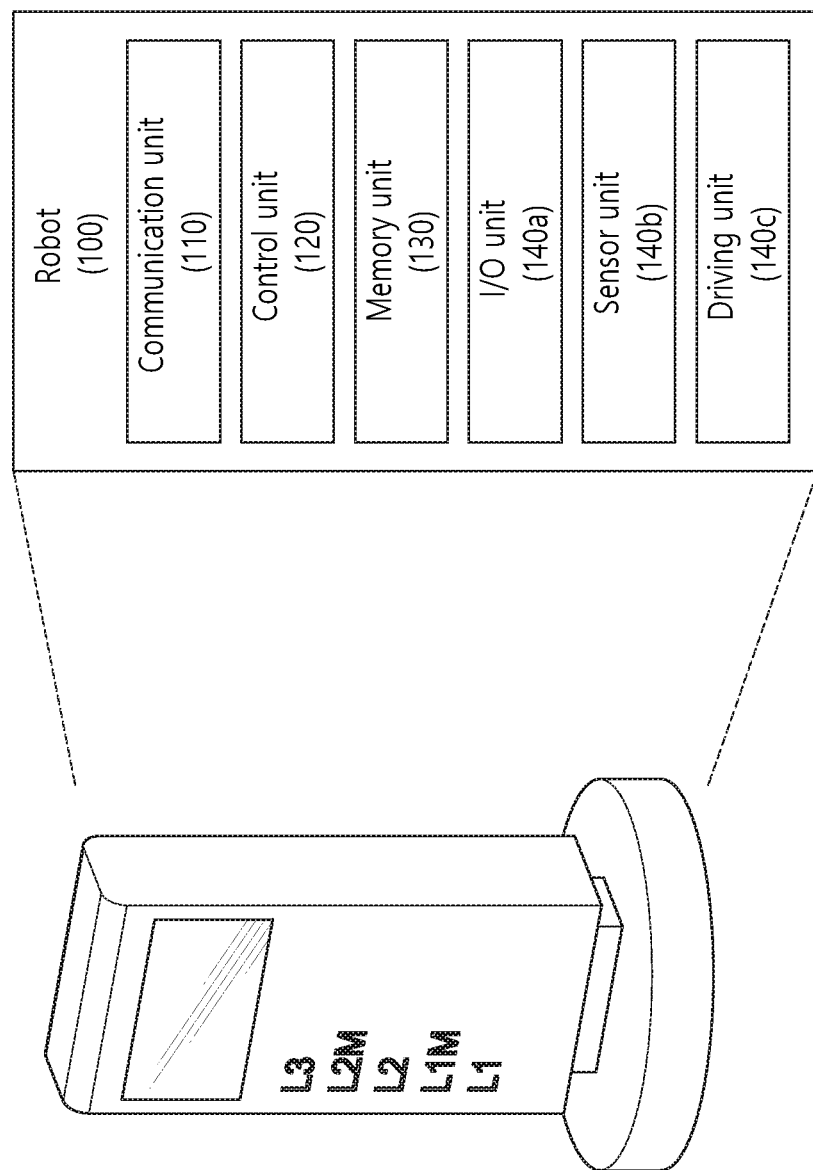
FIG. 28 shows a robot, in accordance with an embodiment of the present disclosure.

FIG. 28 shows a robot, in accordance with an embodiment of the present disclosure. The robot may be categorized into an industrial robot, a medical robot, a household robot, a military robot, etc., according to a used purpose or field.

Referring to FIG. 28, a robot 100 may include a communication unit 110, a control unit 120, a memory unit 130, an I/O unit 140*a*, a sensor unit 140*b*, and a driving unit 140*c*. Herein, the blocks 110 to 130/140*a* to 140*c* correspond to the blocks 110 to 130/140 of FIG. 23, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, etc.

Figure 29:
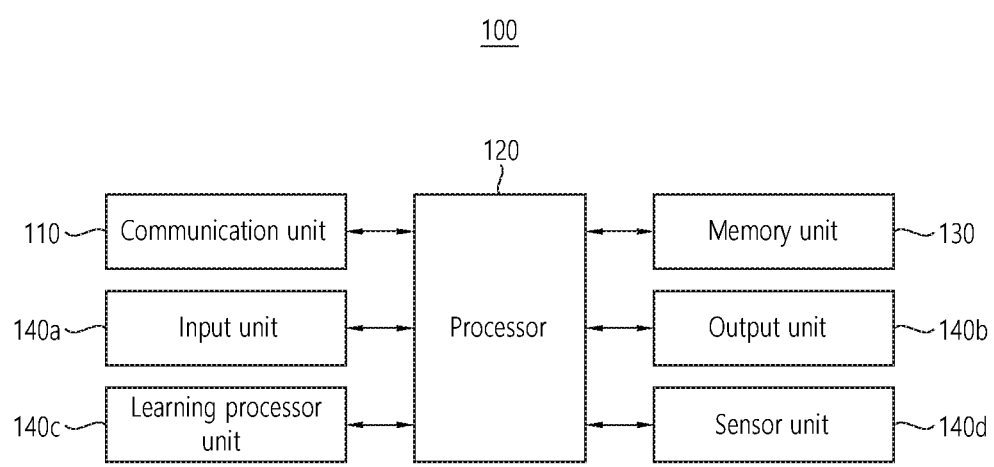
FIG. 29 shows an AI device, in accordance with an embodiment of the present disclosure.

FIG. 29 shows an AI device, in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 29, an AI device 100 may include a communication unit 110, a control unit 120, a memory unit 130, an I/O unit 140a/140b, a learning processor unit 140c, and a sensor unit 140d. The blocks 110 to 130/140a to 140d correspond to blocks 110 to 130/140 of FIG. 23, respectively.

The communication unit 110 may transmit and receive wired/radio signals (e.g., sensor information, user input, learning models, or control signals) to and from external devices such as other AI devices (e.g., 100x, 200, or 400 of FIG. 22) or an AI server (e.g., 400 of FIG. 22) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 22). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 22). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

What is claimed is:

1. A method for operating a first apparatus in a wireless communication system, the method comprising:
    receiving one or more traffic classes (TCs) related to one or more packets from a higher layer;
    mapping the one or more TCs and one or more proximity-based service per-packet priorities (PPPPs); and
    transmitting the one or more packets related to the one or more PPPPs to a second apparatus based on the mapping,
    wherein each of the one or more TCs and each of one or more PPPPs are mapped one-to-one,
    wherein at least one first TC, among the one or more TCs, having a value smaller than a predetermined threshold value is allocated to a decentralized environmental notification message (DEMN),
    wherein at least one second TC, among the one or more TCs, having a value larger than the predetermined threshold value is allocated to a cooperative awareness message (CAM), and
    wherein the smaller value of TC has a higher priority.

2. The method of claim 1, wherein mapping the one or more TCs and the one or more PPPPs comprises:
    configuring a mapping table between the one or more TCs and the one or more PPPPs;
    determining a PPPP value mapped to the one or more TCs based on the mapping table; and
    transmitting the mapped PPPP value and a packet related to the mapped PPPP value to an access layer.

3. The method of claim 1, wherein mapping the one or more TCs and the one or more PPPPs comprises:
    mapping the one or more TCs and the one or more PPPPs based on preconfigured mapping information in the first apparatus.

4. The method of claim 1, further comprising:
    receiving mapping information through RRC signaling,
    wherein mapping the one or more TCs and the one or more PPPPs comprises:
    mapping the one or more TCs and the one or more PPPPs based on the mapping information.

5. A method for operating a first apparatus in a wireless communication system, the method comprising:
    receiving one or more packets from a second apparatus;
    mapping one or more traffic classes (TCs) and one or more proximity-based service per-packet priorities (PPPPs) related to the received one or more packets; and
    transmitting the one or more packets related to the one or more TCs to a higher layer based on the mapping,
    wherein each of the one or more TCs and each of one or more PPPPs are mapped one-to-one,
    wherein at least one first TC, among the one or more TCs, having a value smaller than a predetermined threshold value is allocated to a decentralized environmental notification message (DEMN),
    wherein at least one second TC, among the one or more TCs, having a value larger than the predetermined threshold value is allocated to a cooperative awareness message (CAM), and
    wherein the smaller value of TC has a higher priority.

6. The method of claim 5, wherein mapping the one or more TCs and the one or more PPPPs related to the received one or more packets comprises:

mapping the one or more TCs and the one or more PPPPs based on preconfigured mapping information in the first apparatus.

7. The method of claim 5, further comprising:
receiving mapping information through RRC signaling,
wherein mapping the one or more TCs and the one or more PPPPs related to the received one or more packets comprises:
mapping the one or more TCs and the one or more PPPPs related to the received one or more packets based on the received mapping information.

8. The method of claim 5, wherein mapping the one or more TCs and the one or more PPPPs related to the received one or more packets comprises:
determining at least one TC related to the one or more PPPPs among the one or more TCs; and
determining a TC of which priority is a highest among the at least one TC.

9. A first apparatus configured to operate in a wireless communication system, the first apparatus comprising:
one or more transceivers;
one or more processors; and
one or more computer-readable storage memories connected to the one or more transceivers and to the one or more processors, and storing instructions that, based on execution by the one or more processors, control the first apparatus to:
receive one or more traffic classes (TCs) related to one or more packets from a higher layer;
map the one or more TCs and one or more proximity-based service per-packet priorities (PPPPs); and
transmit the one or more packets related to the one or more PPPPs to a second apparatus based on the mapping,
wherein each of the one or more TCs and each of one or more PPPPs are mapped one-to-one,
wherein at least one first TC, among the one or more TCs, having a value smaller than a predetermined threshold value is allocated to a decentralized environmental notification message (DEMN),
wherein at least one second TC, among the one or more TCs, having a value larger than the predetermined threshold value is allocated to a cooperative awareness message (CAM), and
wherein the smaller value of TC has a higher priority.

\* \* \* \* \*